(12) United States Patent
Bertino

(10) Patent No.: US 10,905,048 B2
(45) Date of Patent: Feb. 2, 2021

(54) SELF-ADJUSTABLE FEEDER FOR SUGAR CANE HARVESTING DEVICE

(71) Applicant: INDÚSTRIAS REUNIDAS COLOMBO LTDA, Pindorama (BR)

(72) Inventor: Luiz Henrique Bertino, Pindorama (BR)

(73) Assignee: INDÚSTRIAS REUNIDAS COLOMBO LTDA, Pindorama (BR)

( * ) Notice: Subject to any disclaimer, the term of this patent is extended or adjusted under 35 U.S.C. 154(b) by 272 days.

(21) Appl. No.: 16/041,184

(22) Filed: Jul. 20, 2018

(65) Prior Publication Data
US 2019/0021230 A1 Jan. 24, 2019

(30) Foreign Application Priority Data
Jul. 21, 2017 (BR) .............................. 102017015754

(51) Int. Cl.
*A01D 57/22* (2006.01)
*A01D 45/10* (2006.01)
*A01D 69/03* (2006.01)

(52) U.S. Cl.
CPC ............. *A01D 57/22* (2013.01); *A01D 45/10* (2013.01); *A01D 69/03* (2013.01)

(58) Field of Classification Search
CPC ........ A01D 57/22; A01D 45/10; A01D 69/03; A01D 34/664; A01D 63/02
See application file for complete search history.

(56) References Cited

U.S. PATENT DOCUMENTS

| | | | | |
|---|---|---|---|---|
| 3,945,177 A * | 3/1976 | Scott | ...................... | A01D 45/10 56/12.7 |
| 4,099,365 A * | 7/1978 | Hudson | .................. | A01D 43/00 56/13.5 |
| 4,270,337 A * | 6/1981 | Pinto | ...................... | A01D 45/10 56/13.9 |
| 4,470,244 A * | 9/1984 | Leigers | .................. | A01D 63/02 56/13.9 |
| 4,896,492 A * | 1/1990 | Junge | ................... | A01D 46/081 56/13.5 |
| 5,191,759 A * | 3/1993 | Baker | .................... | A01D 45/10 56/500 |
| 7,694,501 B1 | 4/2010 | Hinds et al. | | |
| 8,230,668 B2 * | 7/2012 | Hinds | ..................... | A01D 45/10 56/53 |
| 8,578,688 B2 | 11/2013 | Hinds et al. | | |

(Continued)

FOREIGN PATENT DOCUMENTS

| BR | PI8706619 | 7/1989 |
|---|---|---|
| BR | 9204564 | 4/1993 |

(Continued)

*Primary Examiner* — Arpad Fabian-Kovacs
(74) *Attorney, Agent, or Firm* — B. Aaron Schulman, Esq.; Stites & Harbison, PLLC

(57) ABSTRACT

A self-adjustable feeder for a sugarcane harvesting device having two vertical feeding rollers rotating in opposite directions, aligned side by side and horizontally moving, kept under traction one against the other by at least one actuator. The upper edges of both feeding rollers, besides being coupled to hydraulic engines rotating in opposite directions, are also hinged to a rear opening and closing structure, with a guiding system to change the distance between the vertical centers of the feeding rollers.

9 Claims, 12 Drawing Sheets

(56) References Cited

U.S. PATENT DOCUMENTS

| | | | |
|---|---|---|---|
| 9,781,880 | B2 | 10/2017 | Cleodolphi et al. |
| 9,788,489 | B2 | 10/2017 | Jager |
| 9,857,785 | B2 * | 1/2018 | Richard .................. A01D 45/10 |
| 9,894,832 | B2 * | 2/2018 | Scrivner ............... A01D 34/006 |
| 10,477,766 | B2 * | 11/2019 | Burch .................. A01D 43/063 |
| 2010/0115904 | A1 | 5/2010 | Cannavan |
| 2010/0307121 | A1 | 12/2010 | Marchini |
| 2012/0110967 | A1 | 5/2012 | Hinds |
| 2012/0110968 | A1 * | 5/2012 | Hinds .................... A01D 45/10 56/53 |
| 2012/0110969 | A1 | 5/2012 | Hinds |
| 2015/0359177 | A1 * | 12/2015 | Richard ............... A01D 34/664 56/14.7 |
| 2015/0362904 | A1 * | 12/2015 | Scrivner ................ A01D 45/10 700/275 |
| 2017/0280626 | A1 * | 10/2017 | Bertino .................. A01D 75/28 |

FOREIGN PATENT DOCUMENTS

| | | |
|---|---|---|
| BR | PI9303218 | 5/1994 |
| BR | PI9206252 | 12/1994 |
| BR | PI9303089 | 3/1995 |
| BR | MU7500199 | 7/1995 |
| BR | PI9400226 | 9/1995 |
| BR | PI9500633 | 8/1997 |
| BR | PI9704373 | 3/1999 |
| BR | PI9704191 | 5/1999 |
| BR | PI9802986 | 3/2000 |
| BR | MU7900025 | 9/2000 |
| BR | PI9904482 | 9/2000 |
| BR | PI0106044 | 11/2001 |
| BR | PI0201867 | 5/2002 |
| BR | PI0302376 | 3/2005 |
| BR | MU8400814 | 5/2005 |
| BR | MU8400083 | 9/2005 |
| BR | PI0504922 | 7/2007 |
| BR | PI0504923 | 7/2007 |
| BR | PI0504925 | 7/2007 |
| BR | PI0505161 | 8/2007 |
| BR | PI0505162 | 8/2007 |
| BR | MU8600817 | 12/2007 |
| BR | PI0602115 | 1/2008 |
| BR | PI0602398 | 1/2008 |
| BR | PI0603248 | 3/2008 |
| BR | MU8801206 | 8/2009 |
| BR | PI0804386 | 7/2010 |
| BR | PI0924091 | 7/2010 |
| BR | MU8800901 | 10/2010 |
| BR | PI0900660 | 11/2010 |
| BR | PI0900868 | 12/2010 |
| BR | PI0901847 | 1/2011 |
| BR | PI0902597 | 3/2011 |
| BR | PI0709365 | 7/2011 |
| BR | PI0803094 | 8/2011 |
| BR | PI0905146 | 8/2011 |
| BR | PI0905546 | 8/2011 |
| BR | MU9000243 | 11/2011 |
| BR | PI1102255 | 9/2012 |
| BR | PI1003832 | 2/2013 |
| BR | 102012009691 | 7/2013 |
| BR | MU9101818 | 8/2013 |
| BR | PI1106521 | 8/2013 |
| BR | 202012020652 | 6/2014 |
| BR | 102012016510 | 8/2014 |
| BR | 102012007864 | 9/2014 |
| BR | 202012021829 | 10/2014 |
| BR | 202013016074 | 11/2014 |
| BR | 202013013145 | 1/2015 |
| BR | 102012013599 | 2/2015 |
| BR | 202014014292 | 2/2015 |
| BR | 202014014302 | 2/2015 |
| BR | 202013013322 | 5/2015 |
| BR | 102013010820 | 6/2015 |
| BR | 102014005942 | 12/2015 |
| BR | 102013016989 | 7/2016 |
| BR | 112012031090 | 10/2016 |

\* cited by examiner

CORTE A-A

B-B CUT

C-C CUT

SELF-ADJUSTABLE FEEDER FOR SUGAR CANE HARVESTING DEVICE

FIELD OF THE INVENTION

The invention refers to sugarcane harvesting and covers a specific set, designed to pull and guide cut stalks to the inner part of a harvesting device. The set comprises at least one pair of vertical traction rollers, both pulled by the respective hydraulic engines, also assembled floating to an appropriate structure, for the distance between them to be self-adjustable according to the volume of sugarcane being cut and entering the machine.

Traction rollers constitute a set pulling and guiding sugarcane shafts after being cut, guiding them to inside the harvesting device, where they suffer different processing steps, depending on the final characteristics as established for harvested sugarcane.

BACKGROUND OF THE INVENTION

Since the invention of the flex engine, the sugar-alcohol field has been marked by a new cycle in the production of sugarcane to obtain fuel alcohol, not only to substitute petroleum due to the high international prices, but also for climate change issues, since ethanol is an alternative source of renewable and less polluting energy. Among the sources of energy as used, sugarcane is now an important energy matrix, overcoming hydraulic energy, only behind petroleum.

Clearly, the consumption of fuel alcohol has considerably increased the production of sugarcane, as well as the consumption of all other products derived from that culture, especially: sugar, food and even their residues, which are used as an energy source, such as bagasse used as fuel for boilers, cellulose production and feed for restrained cattle.

Despite the economic benefits as presented for the expansion of the sugar-alcohol field, environmental impacts caused by burning are worrying and, for that reason, there are already laws forbidding plant burning during the harvesting stage. These laws, despite not having a deadline to come into force, have already become an instrument to facilitate significant changes in agricultural devices used for sugarcane harvesting, without a burning stage for its foliage.

Considering current law circumstances and targeting small and medium producers of sugarcane products, the industrial field for agricultural devices has concentrated efforts to develop new machines for sugarcane harvesting without its previous burning, as taught by the documents as listed below.

BR102014032669—sugarcane harvesting machine, having a sloped transporter carrying sections of sugarcane from the harvesting machine inside a collection cart, having at least two traction devices extending in parallel to each other and having continuous carriers, circulating over upper motor wheels and lower deflection wheels, jointly guided and located at the feeding area for sugarcane sections. Therefore, the sloped carrier has long working life with low maintenance and the sugarcane harvesting machine operates quietly and efficiently from the energy point of view, with high cleaning effect. Continuous traction devices are belts made of crosslinked polymer textile with a reinforced layer, and protrusions are located at a distance from each other, on the lower side of the belts, for forced activation by motor wheels. The belts are connected by a plurality of crosswise shafts, which, as a whole, form a screening base and a support base, and the deflection wheels, which are jointly guided and designed as individual wheels.

BR112015031412—teaches a sugarcane harvesting machine with multiple rows, automatic and independent control of multiple cutters used for sugarcane shafts in adjacent rows. Position sensors detect the height of the base cutters over the chassis of the sugarcane harvesting device and send the signals to a controller, so to adjust the height to a pre-selected level. Base cutters are individually activated by hydraulic engines by means of individual hydraulic circuits and the operation pressure is detected and fed to the controller to check for a strangling condition. A load sensor is incorporated between the link and the chassis of the sugarcane harvesting machine, so to check if the base cutters are in contact with the soil to lift the base cutters.

BR202014014302—sugarcane harvesting machine, comprising one or more cutting sets, wherein said sets allow to cut cane culms close to the soil, so to be subsequently delivered by centering rollers to a cutting roller, to cut the culms into pieces, being said pieces thrown onto a central belt, from there to the elevator and to inside the machine.

BR202014014292—device for harvesting sugarcane, comprising one or more cutting sets, wherein said sets allow to cut cane culms close to the soil, so to be subsequently chopped on the front part of the machine by means of chopping rotors, wherein said chopped cane is transported by means of side belts to a central belt and, from there, to the elevator inside the machine.

BR102014005942—sugarcane harvesting device, comprising a first and a second elevator for chopped cane, wherein the first elevator is located in a substantially central position in the harvesting device, the first elevator guides the chopped cane to the second elevator and the second elevator guides the chopped cane to a region outside the harvesting device, providing for a lighter and more efficient set, with an enhanced system for impact absorption for the elevator for chopped cane elevator with the spillover being displaced next to the harvesting device during the harvesting operation.

BR102013016989—improvements to cutting sets of a sugarcane harvesting machine, having a set of cutting discs provided with flexible laminated arms located at their fitting and fixing cavities, for quick juxtaposition and fixation of cutting knives, at their edges, and openings for mechanically fixing taliscas in their upper structure, for guiding and pulling cut cane to inside the industrial processing system for raw material and transference to the transshipment cart.

BR202013016074—arrangement applied to an implement for harvesting sugarcane, constituted by a duct with an outlet nozzle at 90 degrees over the lower part and an inlet nozzle fixed to the chassis of the harvesting device, for operation added to the unloading gutter for a funnel body and flap, installed on the fixing bearings of the elevator, forming one single implement of an independent sugarcane harvesting device of its own, to cut the whole cane and throw it to the side of the cane row which has not already been cut, for it to be harvested jointly with the upright row, thus increasing the productiveness of the conventional harvesting device.

BR202013013322—machine for cutting and harvesting sugarcane, comprised by a tractor, coupled to which are transport devices provided with various tractor sets formed from upper and lower rollers, activated by a hydraulic engine, being the transport devices close to their intermediate sections provided with hinged hydraulic cylinders fixed to said tractor, while their lower sections provide guides followed by height limiters, which front edge retains cutting discs over which guiding plates are located, while the rear edges are provided with chopping sets housed in directing tubes provided with fans located over silos; these being tilted by hydraulic cylinders, below which rotating conveyor belts are located, promoting a 180° turn, having their vertical angle controlled by a hydraulic cylinder.

BR202013013145—sugarcane harvesting machine for simultaneous harvest in two rows, which main purpose is to simultaneously cut two planting rows of sugarcane, being said simultaneous harvest allowed due to changes in the width of the opening axis of the cowl or line divisor; a change in the bobbin case rotating the cutting discs allows to simultaneously cut two planting rows.

BR102013010820—sugarcane cutting device coupled to a tractor for simultaneously cutting two cane rows, which is provided with drums, an emerging disc, base cutting discs, line divisors and soil followers, wherein the lower part of the cutting device, i. e. the part below the chassis, is responsible for cutting the lower part of the cane close to the soil, and this part is constituted by two soil followers, two row dividers, two coupling structures for the row divider and the base cutter, two propeller springs for the soil follower, two dumpers, two base cutting discs, knives, two hydraulic engines, two cane guiding flaps, two supports for the base cutters, two hydraulic base cutting cylinders and a cane alignment case, wherein the soil follower is connected to the line divisor by means of a pivoting pin allowing that part to follow soil unevenness and irregularities; the propeller spring for the soil follower has the object to keep the soil follower close to the soil, the line divisor is fixed to the coupling structure of the line divisor and the base cut, and, to that same structure, the dumper for the base cutting disc is also fixed, the structure being connected to the base hydraulic cutting cylinder which, when activated, lifts or lowers said structure, which consequently moves upwards or downwards the base cutting disc and the line divisor, the base cutting disc; and its respective hydraulic engine is supported by the base cutting support, which, at one of its edges, is fixed to the structure by a pivoting pin and, on the other edge, is fixed to the dumper.

BR202012021829—platform which may be coupled to motor harvesting machines for cutting and collecting sugarcane and other forage crops, aiming to extend its use to different kinds of motor harvesting devices. Said platform allows to cut and collect two culture rows, which are separated by means of conic rollers; the cut of the culture is performed by a precise base cutting system close to the soil, which is performed by means of cut discs; after cutting, a set of rollers allows the material to be pulled to inside the platform, being said operation performed by the tumbling rollers (7), lifting rollers (8) and by the roller set (11), constituted by floating conveyor rollers (12) and fixed conveyor rollers (8). The rollers, in their embodiments, have embodiment forms and positions allowing for better strength and efficiency of the platform.

BR202012020652—double device for cutting and feeding the sugarcane harvester, having a hinged arm fixed to the structure of the harvesting device, a metal support structure, a set of rotating discs and knives and guiding flaps, used for cutting and collecting sugarcane in one single step, substituting the existing systems with numerous advantages, such as quick harvest, convenience and savings in time and fuel.

BR102012016510—support device for sugarcane cutting, which may be coupled to a harvesting device, being an independent cutting device, which may be coupled to the side with a projection frontwards of the sugarcane harvesting device before the natural cut, formed by a hinged arm, hydraulic cylinder, rotating cutting disc, guide for the cutting flow, and guiding the cut cane towards the center of harvesting device for single processing, optimizing its activation.

BR102012013599—high capacity device for a sugarcane harvesting device, constituted by row dividers with a set of a hydraulic engine and a linking axis to a base cutting disc with a hubcap for regulating cutting height, wherein the discs located at line dividers cut a row of cane from each side and forwards the cut cane to the center of the equipment; wherein it is collected by the original base cut of the harvesting device and sent to the chopping cylinders of the harvesting device, followed by the original elevator of the machine until being thrown over the trucks or cane transshipment carts.

BR102012009691—mechanized cutting system for sugarcane with a base cutting disc with upper lock, wherein the fixing form of the base knives, instead of being performed below, is performed on the upper side, being fitted to the disc between elements forming drawer-like containers, wherein said cutting disc is provided with a central opening surrounded by small fixing holes to the harvesting machine, and the edge, on its upper side, receives smaller parallelepiped bars located in parallel to each other and spaced by a screwed central passageway, through which the screwed locking pin will be located, which base will be inserted in the end hole of the opposed protection plate and a base cutting knife cover (not shown), side by side with the union screw which, added to the screwed channel, will fix the whole set, also in between larger parallelepiped bars, thus forming the drawer-shaped container on the inner side of the disc.

BR102012007864—harvesting device for sugarcane activated by a double cutting chain, having a four-wheel drive chassis, acclimatized cockpit, a diesel engine between 350 and 400 HP of power, propelling a platform for cutting and harvesting sugarcane, a side flap with a double chain with cutting knives (activated by two hydraulic engines), enabling the cane to be guided, a helical rotating shaft activated by two hydraulic engines having, on their surface, flaps guiding the cane to the center of the platform; subsequently, a device on the platform base, moved by a double chain with knives, also activated by two hydraulic engines, cuts the base of the cane (not reaching its root) being guided to a second shaft provided with flaps dragging the cane to inside the device, wherein a third shaft, also activated by two hydraulic engines having a double chain, identical to the base cut, but which will eccentrically chop the cane according to the desired size as pre-programmed by the operator, the chain being kept in a single direction; a fourth shaft will stabilize the perfect rotation of the device supporting the base of the chain; on the other hand, the base of the chain drags the cane already cut to a lifting belt passing through the cleaning exhaust fan, guided to the second belt which will load it for transportation. All the belts are activated by hydraulic engines.

BR102012006658—harvesting device for collecting stalks of stalk-like plants and a base cutter for a harvesting device, including a chassis, at least one propelling device in contact with the ground connected to the chassis, and a base cutting set. The base cutting set is coupled to the chassis. The base cutting set includes a plurality of cutting blades and a pair of counter-rotating plates. The pair of counter-rotating plates includes a first plate and a second plate, each one having at least one of the plurality of cutting blades fixed to it. The first plate turns around a first axis. The first plate has at least one of its portions extending towards a radial direction, so that the portion interferes with the second plate blade, with the exception that the first plate is displaced towards a parallel direction to said first axis over said blade of said second plate.

BR112012031090—covers a harvesting device for harvesting in rows of plants to be harvested such as sugarcane, with at least one harvesting unit having at least one pair of harvesting cylinders with two harvesting cylinders located obliquely, upwards and side by side, as a harvesting set for defoliating of shafts of the plants being harvested, wherein the shafts, during the defoliation process, are pierced between the rotating brush cylinders, being at least partially defoliated by the joint action brushing cylinders. The invention provides a possibility for regulating brushing cylinders crosswise to the direction of harvesting, so that, by changing the reciprocal distance between the brushing cylinders, it may regulate, in case of need, the grade of defoliation in the defoliating process.

BRPI1107105—stalk plant harvesting device for cutting edges of plants including a frame, a pair of cutting blades loaded by the frame and a deflecting flap, coupled to a pivot in the frame. Cutting blades are spaced from each other over the direction of displacement, with each cutting blade turning around a respective vertical axis. The deflecting flap is selectively movable from a first position to guide cuttings to one side of the topper, and a second position to guide the edges cut to an opposite side of the topper.

BRPI1107149—teaches a stalk processing section of a harvesting device to harvest stalks of stalk-like plants, the harvesting device having a main frame which is movingly coupled to a chassis. The processing stalk section includes a base cutting set movingly coupled to the main frame. The base cutting set includes a cutting roller, a top lifting roller and/or an upper feeding roller. The base cutting set also includes a set of rails and a set of wheels. The set of wheels engages the set of rails. The set of rails is fixed to the main frame and/or to the base cutting set. The set of wheels is rotatingly coupled to the main frame and/or to the base cutting set. The set of rails and the set of wheels are configured to limit the movement of the base cutting set along a path established by the rails and by the wheels.

BRPI1106521—a bilateral aligning cutter for sugarcane, combining a sugarcane alignment and cutting device, with a unique bilateral transference device moving a deposition belt for cane cut by the central base cutting set to the aligners and respective wheels, enabling to choose the cutting side of the plant roots.

BRMU9101818—arrangement applied to the head of a sugarcane harvesting machine to be installed on a motor device, having a head constituted by a plate and framed, on the upper part of the plate, by hinging by means of a hinged joint, facilitating the movement of a hinged plate, the latter being for fixation to the upper part of the motor device, wherein the plate is received by advancement including the whole part of motor mechanization and its hydraulic distribution constituents; said advancement is already coupled by the device and the head is protected by side grids.

BRPI1102255—agricultural device which may be coupled to a tire tractor or another kind of motor device for sugarcane harvesting by cutting its base, constituted by a device with an external vertical structure guiding to an internal sliding vertical structure, raised by a hydraulic piston, from which supports are projected to support structural axes, with a pair of hydraulic pistons, so to allow for movements on both sides around 10°; from the frame, a structure is projected with a pair of handles, wherein a pair of hydraulic pistons with tire bearing arms is hinged at a distance from the soil hinges, with the hydraulic pistons raising and lowering arms with motor reducers turning rotating elements with sloped shafts to push the cane, alternating with the cutting knives, protected by a curved protecting grid with laminar base, also curved, which development aims to increase the harvesting productivity of sugarcane or another kind of crop wherein the shaft must be cut close to the soil, with huge cost reduction for eliminating the use of hand work by rural workers and the use of dedicated equipment, eliminating the problems of soil compaction by the use of heavy equipment.

BRPI1003832—mower machine for whole sugarcanes, activated by an independent motor unit, which may be coupled by its side and in parallel to the motor unit or tractor by means of a hinged crosswise bar, comprising a cane trimming device and a guiding set for them, ordering and positioning them for cutting close to the soil by a base cutting device, so to deliver cut canes to a set of cylinders and rotating brushes turning at such speeds to transport them and provide for shedding or peeling, keeping them in a single piece; those cylinders may be covered by gum or another elastic material similar to protuberances over its surface, so to move the canes more efficiently not damaging them, and optionally, a car or attachment forming a tandem set engaged to the mower to receive clean canes, store and transport them to the place of unload.

BRMU9000243—arrangement applied to a mechanical sugarcane harvesting device with a tilting cartridge, consisting of a sugarcane harvesting machine pulled by a tractor, assembled over a single chassis supported over wheels, comprising a tilting cartridge over said chassis, wherein said cartridge is supported over an upper axis and a lower bearing, wherein it is supported by pneumatic cylinders and end side skates, also having a pulling and cutting system performed by a pair of upper rotating cylinders.

BRPI1000129—mechanical device for harvesting sugarcane, having a lower collection device for harvested material. The mechanical device has a displacement direction and the mechanical device has a chassis and an upper device for collecting harvested material attached to the chassis. The upper device for collecting harvested material includes at least one moving device and a device for cutting stalks. The at least one moving device is designed to substantially surround a stalk of a harvested cane plant while the at least one moving device is moving. The at least one moving device is additionally designed to fold the head of the harvested cane plant into a direction which is substantially opposed to the displacement direction. The stalk cutting device is located close to the at least one moving device. The fitting device for the stalk is designed to cut the peduncle of the harvested cane plant.

BRPI0905146—sugarcane harvesting machine provided with at least one line divider set; a sensor, able to allow to measure the distance between the line divider set and the soil; an electronic control unit operatively linked to the sensor; and a height regulation device, operatively linked to the electronic control unit and to the line divider set, being the electronic control unit designed to allow for the automatic activation of the height regulation device over the divider set by means of at least one measurement of the sensor. The invention also refers to a system for the regulation of the height of a constituent of an agricultural device, the system comprising at least one sensor able to allow the measurement of the distance between the agricultural device and the soil; an electronic control unit operatively linked to the sensor; and a height regulation device operatively linked to the electronic control unit and to the agricultural device constituent, the electronic control unit being designed to allow the automatic activation of the height regulation device over the agricultural device constituent, by means of at least one measurement of the sensor.

BRPI0905546—sugarcane harvesting device, constituted by a system for mowing, decantation and storage of the respective juice, of the kind using a system for harvesting and chopping sugarcane, characterized by a kind of automotive trailer pulled by a tractor, constituted by a chassis, a head engaging the harvesting device to the tractor, wherein the cardan activates the hydraulic system, moving the hinging arm and cutting blades, wherein the engine activates the rollers pulling the shaft of the cane by a trimmer, cutting it by means of blades and sending them to the chopper, constituted by blades to chop the shaft and a shovel system transporting the chopped stem to the mower by means of the shaft transporting tunnel, wherein said mower grinds the chopped cane and sends it to a decanter, and the sugarcane juice is sent to a pre-reservoir and, subsequently, by means of an electric pump, to a final reservoir.

BRPI0902597—head for harvesting sugarcane, having a telescopic system for opening the harvesting front, a pressing system, a base cutting system by chain following the soil profile and an edge cutting system, everything coupled to a center shaft with a rotating hydraulic cylinder at the lower edge and coupling to the lower edge for conventional cane carriers. Said system allows to cut, trim and press the bundle, and to carry the bundle onto usual trucks and transshipment carts, able to harvest upright and/or lying cane, operating in slopes above 12%, besides allowing the cane to be harvested in various kinds of stands (upright cane, lying cane), in different kinds of land sloping (flat soil, sloping up to 12% and highly sloping, above 12%), by using current cane loading machines.

BRPI0901847—microcutter for sugarcane designed to cut cane on irregular terrains, with sloping and speed of up to 5 km/h; constituted by a chassis, wherein two support arms are provided on the side part and a pivot shaft on the rear part, with a roof and shaft fixed at said chassis sustaining, on its front part, a deflecting plate, hinged by a hydraulic cylinder, which is fixed on the supporting table for the base cutting, fixing two vertical draggers on its sides and, on its front part, it holds a set of base cutting blades, also laterally fixing the guide for cut cane and, on its frontal projection, fixing two base cutting guides, which project themselves vertically towards two upper cutting guides, ending at an axis fixing a horizontal dragger surrounding the top cut, thus fulfilling a structure which is able to perform, on irregular terrains, multiple cutting functions on the base and top of the sugarcane, also laterally dragging the cut cane.

BRPI0900868—machine for cutting and harvesting sugarcane, provided, at its lower front section, with lifting sets retaining, on their sides, row dividers formed by lifting spindles fixed at supporting axes provided with shoes and fixed to supports, wherein said spindles are activated by hydraulic engines promoting turning, while their course is limited lengthwise by hydraulic cylinders, and the lifting sets centrally project lengthwise lifting spindles, above which we can find supporting axes provided with shoes and activated by hydraulic engines, wherein, from the supporting axes, control arms are projected, fixing lifting sets, formed from guiding channels provided with a ramp through which guiding shafts supported between rollers fixed to bearings located at chains controlled by gear wheels slide, promoting lengthwise displacement of the spindles, which are linked by shafts located at the supporting shafts and fixed to the supports, wherein, on the upper front section of the main body, we find a topper device formed by centrally located rotating knives, controlled by hinged lengthwise arms, controlled by a hydraulic cylinder and fixed to a support; under the topper device, sets of hinged belts are located, formed from a crosswise "S" profile structure, which front section retains a motor gearing controlled by a hydraulic engine activating a gearing moved by chains, wherein said sets of hinged belts are fixed by hinged arms which are coupled to the supports located at the central sections of the structures and the rear supports located crosswise at the structure of the machine, wherein the arms are controlled by hydraulic cylinders located at their rear sections and on the crosswise supports of the main body. Immediately after the hinged belts, we find a cowl provided, on the front section, with crosswise cavities forming bases, which internally retain supports and externally retain bearings, to which hydraulic engines are fixed so to control pulleys rotating fixed saws, supported over rotating discs located on supports fixed to vertical bars, forming a chopping set, wherein said cowl internally holds an elevator provided with various cups, transported by means of chains provided with bearings and activated by gear wheels fixed to rollers controlled by hydraulic engines; said cups are guided towards an outlet duct located at the upper rear section of said cowl, and aligned over the rear belt located at the rear section of the machine, while the upper front section of the cowl incorporates a fan provided with side ducts coupled to air outlets, wherein, below the cowl, a cutting set is projected, formed by a cutting disc fixed to a support and activated by a hydraulic engine, wherein said disc is laterally adjusted to the soil by means of primary and secondary hydraulic cylinders, engaged to an electronic loading cell, being the machine provided with wheels allowing to turn the equipment between 10 and 180°, which is propelled (moved) by a diesel engine to which hydraulic pumps are connected, which are responsible for generating motor forces and may also be coupled to a tractor and work as an agricultural device, thus eliminating a few elements such as the diesel engine itself and the cockpit, by connecting the hydraulic pumps directly to the propelling tractor and operational controls being handled by the operator of the tractor itself.

BRPI0900660—enhancements to the section base cut system for harvesting cane, essentially comprising the use of unique cutting knives or inserts, be them triangular, rectangular, square, circular or other, toothed at the ends or side edges, with teeth in the same angle, and side walls with various slopes, these inserts being applicable and fixable, by means of respective tablets for holding inserts, in respective base section cutting discs for harvesting sugarcane, said base disc being preferably metallic and substantially ring-shaped, having two concentric circumferential alignments of holes, respectively close to the internal and external edges, and receiving, on their surface, an equally circumferential alignment, constituted by five tablets holding inserts, preferably of metal, in the form of arc segments, equally provided with two circumferential alignments of holes, the inner ones being intended for fixing, by screws and bolts, to the outer alignment of the base disc, and outer ones to receive and fix knives or toothed inserts in the same angle, and side walls with various slopes, with those inserts per se.

BRPI0924091—method for harvesting sugarcane by means of a harvesting machine, wherein the leaves of at least one sugarcane plant are mechanically separated from at least one stalk, preferably from a plurality of stalks, of a sugarcane plant, by means of at least one defoliating unit, wherein the stalk is separated from the root by means of at least one stalk separation unit and the frond on the edge of the stalk is separated from the stalk by means of at least one cutting unit for the outer layer. According to the invention, the frond is separated from the stalk before defoliating the stalk and discharged and/or carried away.

BRPI0803094—Process for automatically harvesting green sugarcane, by means of a harvesting machine, wherein the leaves of the sugarcane plant are mechanically separated from the stalk of the sugarcane plant, and, only after the leaves are separated (20), the stalk is separated from the rhizome.

BRPI0804386—harvesting machine for sugarcane, for farms and mills and for confining in one single machine, constituted by a highly reinforced chassis, which is assembled over an axis fixed to two tires. On the frontal structure of the machine, two harvesting rollers provided with cutting knives are located, sloped to the front, especially for the base cut to be diagonally performed not shaking the stump. The side discs of the main rotor may be substituted, are free from welding and the diameter of the rotor may be between 600 and 1200 millimeters, according to the requirements of the size of the piece of cane, also having internal plates between the discs, better separating the straw and the pieces, and providing for better throwing the harvested material through the outlet gutter, thus avoiding clogging. Rotor knives have anatomic shape, with specific folding and angles to avoid harming the pieces of the cane. The machine has been fully developed to harvest cane with high yielding, such as and especially for cane which has been planted and cultivated by dripping, harvesting two sugarcane rows at once; it is compact in comparison to other similar machines, but has better performance, produces better quality pieces with less waste or loss in harvesting, causing innovation, high technology and evolution to its mechanical structure, being thus perfect for the current sugarcane harvesting requirements.

BRMU8801206—arrangement applied to a mechanical sugarcane harvesting machine, provided with a head for coupling to the third point of a tractor element, wherein the cane is guided by a helical lifter to the front rotor with lower knives acting jointly with the plant topper; the whole cane then follows between a pair of belts to a conduit unloading the cane into a tilting back reservoir; furthermore, the harvesting machine has a herbicide spraying system and another system for the application of inputs working in parallel with the cut of the cane.

BRMU8800901—sugarcane harvesting machine with an independent double cut device and an oblique knife, able to perform two cutting lines, since it presents a pair of central lollypops surrounded by side lollypops, which jointly generate two gaps for gathering the material to be cut by the cutting discs, slightly displaced from the gaps, which supports follow oblique angles over the cutting radius, causing the knives to target the plant at the area wherein the fibers are less dense, being the cutting operation supported by vertical rollers with helical edges and crosswise horizontal rollers in a simultaneous action, greatly facilitating the operation.

BRPI0800094—harvesting machine for sugarcane with a cockpit, comprising a chassis, an edge cutting device, a divider device for the row of canes, a base cutting device, a set of rollers for sugarcane transportation, a chopping device for sugarcane, a cane cleaning device, an engine, an elevator located at its central part comprising a 180° turning device and an engine positioned at its rear part, independently from the chassis. It also has a base cutting device with an attack angle between the machine and the start of cutting at 65° over the soil and base cutting discs which edge is perfectly aligned to the point where the tire firstly touches the soil.

BRPI0718357—a cutting set having a first three-paddle shaped member. Each paddle comprises a flat main body portion and a pair of leg elements linked to a first rotating tubular shaft. A substantially U-shaped blade element is provided, comprising a pair of leg portions and an interconnection portion comprising the cutting blade. The leg portions are fixed to a second rotating shaft. The second axis remains within the first shaft and turns in the opposite direction to the first shaft. When uncut sugarcane is sufficiently pulled to inside the cutting set, the cane will be pushed upwards, being reached by a paddle and, at the same time, will be cut into billets by the rotating blade member. The billets will then be thrown upwards by the force of the rotating paddle.

BRPI0709365—harvesting machine for sugarcane and set for adjustable feeding for the machine. A harvesting machine for cane on double rows has two separate feeding sets, located side by side, each feeding set being adjustable for the base cutters, fixed to each feeding set, to be "tuned" to the height of the mounds of earth on the cultivated area.

BRPI0603248—machine for cutting sugarcane, moving a blade over the row of plants, performing an advancing movement towards the plants, at the same time that its speed increases up to an adequate speed at a very fast cutting, and a recess when the movement should be re-started, the geometry of the path of the blade being formed by the action of two cranks with opposite rotation directions and angle speeds in a two to one ratio, one crank guiding the arm where the cutting blade is located and the other, faster, crank guiding the arm in an angle by means of sliding shafts.

BRPI0602115—mechanized harvesting method for sugarcane and harvesting machine for sugarcane, initially comprising six stages: edge cutting, separation and flipping over of stems, base cutting, feeding and transportation of stems, storage of harvested stems in a dumpster and unloading of stems by a jaw attached to a mechanical arm.

BRPI0602398—mechanized method for harvesting sugarcane and device for harvesting sugarcane, which may be coupled to an agricultural tractor operating according to that method, to harvest sugarcane and as a whole cane, constituted by six stages: edge cutting, separation and flipping over of stems, base cutting, feeding and transportation of stems, storage of harvested stems in a dumpster and unloading of stems by a jaw attached to a mechanical arm.

BRMU8600817—enhancements introduced in a harvesting machine for sugarcane, constituting a topper, which has been fully technically re-shaped, a rotating fan which height, diameter and rpm have been changed, paddle mixers which have been increased to the average diameter between the disc perimeter and the edge of the knives, the engine as originally positioned on the lower part of the disc, which has been moved to the upper part, the minimum opening of the collector, which dimensions have been changed in 50%, the table, which now has more sloped base bearings, cutting discs, which have been provided with five cutting knives each, the bearing shafts for base cutters, which have been provided with quick change draggers, helping the improving roller in its job to keep the chopper constantly supplied with cane, the cane chopper, which geometry has been fully modified, changing to three supports at 120 degrees for the knives, and also started to use knives throughout the extension of the shaft, but in three sections, to the supports for knives, between which a new support has been created with a rubber plate for the creation of a feeding roller installed between the rear perimeter of the base cutting discs and the shafts of the billet chopper, the incorporation of an inertial wheel on the side of the table, activated by the chopper shaft by means of type V belts, also working as a fuse for eventual locks due to strange objects from the sugarcane field, the new position provided to the primary belt over the table, the table/belt set, which relief system has been fully changed, also including compression springs receiving weight tension by vertical steel cables, allowing to compensate the weight of the set, the old exhaustion system, which has been eliminated and substituted with an axial exhausting device with anti-turbulence deflectors, first and secondary belts, which received a quick system for fixing taliscas, the change of the hydraulic system responsible for displacing the machine, the area housing the diesel engine and radiators, which has been fully isolated and closed by protection screens and received a forced cooling system, the turning system for the secondary belt, activated by hydraulic cylinders, which has been substituted with a rack and endless shaft system activated by a hydraulic engine, the inclusion of a floating system provided by traction springs, and the creation of a system allowing to perform fine adjustment, by varying both height and slope of the base cuts.

BRPI0505162—reversible device for harvesting of sugarcane with application to the mechanized harvesting of burnt and non-burnt sugarcane, provided with the stages of topping, plant positioning, primary cleaning the plant by rotating bristle rollers, stem cutting by stem cutters with the plant in the upright position, base cutting simultaneously to stem cutting, internal transportation of stems, secondary cleaning by crossed air flow, stem lifting and third cleaning of stems by crossed air flow.

BRPI0504922—reversible device for harvesting sugarcane with application for mechanized harvesting of burnt and non-burnt sugarcane, provided with stages of topping, plant positioning, stem cutting by stem cutters with the plant in the upright position, base cutting simultaneously to stem cutting, internal transportation of stems, primary cleaning the plant by crossed air flow, and lifting and secondary cleaning of stems by crossed air flow in a reversible stem elevator to the right and to the left side.

BRPI0505161—method and device for harvesting sugarcane with application to the mechanized harvesting of burnt and non-burnt sugarcane, provided with stages of topping, plant positioning, stem cutting by stem cutters with the plant in the upright position, base cutting simultaneously with stem cutting, internal stem transportation, primary cleaning the plant by crossed air flow, and lifting and secondary cleaning of stems by crossed air flow.

BRPI0504923—method for mechanized sugarcane harvesting and device for harvesting of sugarcane with application for the mechanized harvesting of burnt and non-burnt sugarcane, provided with stages of topping, plant positioning, primary plant cleaning by rotating bristle rollers, stem cutting by stem cutters with the plant in the vertical position, base cutting simultaneously to stem cutting, internal stem transportation, secondary cleaning by crossed air flow, stem lifting and third stem cleaning by crossed air flow.

BRPI05014925—method and device for mechanized sugarcane harvesting with application to the mechanized harvest of burnt and non-burnt sugarcane, provided with stages of topping, plant lifting and positioning, cleaning straw and leaves with the plant in the upright position and before cutting, base cutting, internal stem transportation, lifting, storage of harvested stalks in a reservoir in good order and unloading.

BRMU8400814—Arrangement introduced in a cutting device for harvesting machines for sugarcane and similar having a device for cutting and transporting sugarcane, provided with two rotating devices in a lower crosswise position to the minimally sloped chassis, preferably horizontally, providing for reduced angle of the cutting disc over the soil level, being both rotating devices provided, at their lower edges, with discs containing knives located in angle and not aligned to the center of the disc per se; above the cutting disc, a roller is located to provide for slight sloping of the sugarcane to the front of the harvesting machine; introduction of a transporting roller—lifting and re-organizing the others, so to better guide the stem to the chopper rollers and reduce the loss of sugarcane.

BRMU8400083—harvesting machine for forage to collect harvests in the field, such as sugarcane, green maize and sorghum, by cutting and capturing stalks and forages, being said harvesting machine for forage attached at its rear and side edges to a tractor, wherein said tractor is constituted by a cart on its rear part, so that the harvesting machine for forage is included in its front part, an aligning grid wherein said grid aligns and positions crops which remain tipped over, leaving said crops in an upright position, for the crop to be cut very close to the soil, by two circular saws, wherein said circular saws are attached by bolts to the rollers, where they perform the function of capturing and moving the crop, being a fixed roller and a moving roller, with the following purpose; when a relatively excessive quantity of the crop enters, the roller is displaced to one side, making the crop pass through not smashing or forcing the rollers, the crop passing through another stage, i. e. chopping, performed by a knife and a counter knife, following to a wheel with paddles, throwing the stalks and forage to an outlet nozzle, wherein said nozzle moves to perform even distribution over the cart.

BRPI0302376—agricultural device for collecting sugarcane after being cut and thrown to the soil, comprising a pair of approximately C-shaped jaws. According to the invention, the agricultural device comprises a support structure hinged to a tractor vehicle; at least one first impeller means connecting the support structure to the tractor vehicle, so to displace in angle the support structure around its hinging to the tractor vehicle; a support frame hinging the pair of jaws to the support structure, so to allow the pair of jaws to be vertically displaced, keeping the same sloping over a plane of reference; and at least a second impeller means, simultaneously attached to the support frame and to the pair of jaws, so to displace in angle the support frame and, vertically, the pair of jaws.

BRPI0201867—Motor machine for harvesting sugarcane, constituted by a tubular chassis linked to two shafts, being a rear one intended to traction and a front one, hinged by a central pin for turning the wheels, provided, with the topper projected to the front of said front shaft, provided with a three-blade disc, for displacement of the edges outside the cutting area of the canes. On the central part of the machine, a table is provided to add the base cutting discs provided with cutting knives, the cane chopper, provided, on the other hand, with two half knives fixed to each shaft, and the primary belt, which purpose is to transport cane billets from the table to the exhaustion system and later to the secondary belt, unloading to the collection or transshipment vehicle on the left or on the right of the harvesting machine, as a function of its 180° rotating movement.

BRPI0106044—row divider device for harvesting machines for sugarcane, comprising a frame carrying at least one lollypop operatively linked to an engine and to a lower skate assembled on the front of the chassis of the machine for harvesting sugarcane by means of a hinging device formed by two pairs of lengthwise arms, each pair comprising an upper arm and a lower arm, said upper and lower arms having front edges hinged to the structure of the row divider device and rear edges hinged to the chassis, in an arrangement causing soil forces over the skate to force the upper and lower arms to move in an angle upwards, around its hinges to the chassis.

BRPI0105615—agricultural device to pull out canes, fully with roots, which will be of interest to producers, so to perform crop rotation. The conductor case is adjusted to the front hydraulics, will be visually inspected constantly by the operator who will always pay attention to the perfect operation of the chains in the guiding case, pulling out and transporting canes as pulled out by the box to the frames. Lower chains will be installed at 0.50 cm above the blade, so to take the canes as pulled out by their feet, transporting them grasped by their feet, leaves, stems and buds, in the guiding case. The cane puller, at the rear hydraulics, should have an expert in the cockpit following the performance of the cane puller agricultural device. Ditches appearing after the whole canes are pulled out with roots and earth, covered and leveled.

BRPI0105023—Motor harvesting machine for sugarcane, constituted by a tubular chassis, linked to two shafts, being a rear shaft intended for traction and a front shaft, hinged by a central pin for turning the wheels, having, projected to the front of said front axis, the topper, provided with a two-blade disc, to displace the edges to outside the cane cutting area. On the central part of the machine, a table linking the base cutting discs provided with cutting knives, the cane chopper, provided, on the other hand, with imbedded knives, and the primary belt, which purpose is to transport cane billets from the table to the exhaustion system, and later to the secondary belt unloading to a horizontal belt, both belts, secondary and horizontal, forming a set kept in the working position by a pair of cables and pulleys allowing it to be lowered to the soil for maintenance.

BRPI9904482—Harvesting machine for sugarcane, having at least one pair of cooperating blade discs on the front side, with a contiguous sloped transporter and a chopping device, a cleaning fan and unloading transporter, wherein blade discs turning with no synchronism adjustment are limited at their periphery by a circulating cutting edge each.

BRMU7900025—Agricultural device for harvesting sugarcane, designed to be a unit moved by an agricultural tractor, for cutting straw or burnt cane, working for any kind of soil, being a simple equipment, with easy maintenance, low cost, excellent yielding and keeping uniform cutting of stems, characterized by being constituted by a chassis, supported over the side tire, which is followed by a hydraulic cylinder for height regulation, which is coupled to the tractor by a three-point engaging, being linked to the power outlet to promote torque, generating the movement force at the hydraulic pump case and the set of hydraulic controls, which flow is distributed by the control of solenoid valves, by means of the controls, to the front engines, responsible for the turning movement of lower cutting knives for cutting the whole cane at the stem, for the hydraulic engine of the set for cutting cane edges, which is supported by the adjustable bearing case, responsible for the movement of the game of knives, and, for the transmission engines responsible for turning transmission wheels moving chains, provided with shafts, to catch sugarcane, sustained by a beam frame, with adjustable stretchers, for stretching the chain, forming the transporter, catching the cane with the help of the front guide, which may, at the end of the process, be directly thrown to the soil in rows, or inside a dumpster, sustained by an arm, fixed next to the chassis, which, provided with a hydraulic piston, provides for flipping it over by means of rotating movement over the shaft, forming small mounds over the soil.

BRPI9802986—Enhancements to a machine for harvesting sugarcane, comprised by guiding devices for two rows of sugarcane to be harvested, which sequentially guide, one by one, the round stalks with long foliage forming the crop of sugarcane against a topper device; a device for guiding the stalk foot to a lower device for foliage dragging and threshing, a cutting device, a collection device guiding billets to transporting devices submitting transported billets to the separation or removal of straws which are still present and finally promoting selective and guided transshipment of clean cane billets towards collecting dumpsters following the device on its side.

BRPI9704191—Harvesting and milling machine for sugarcane, constituted by a cutting aligner, a feeding guide which is the support for parts, a conveyor chain to guide feeding fingers, flexible cutting bar, a conveyor belt for raw material and gearing for the conveyor chain; a smashing cylinder, three cylinders, openings for juice outlet, guides for transporting bagasse, a retention grid for bagasse, an alignment bar, sloped sides, a bagasse chopper, tubes and a reservoir for the machine, provided with a vent and an outlet pipe.

BRPI9704373—Cleaning process with a sugarcane harvesting machine and a harvesting machine for sugarcane working according to that process, for harvesting green sugarcane with no capacity reduction and, at the same time, assuring the separation of stalk pieces, formed by sugarcane stalks, from foreign bodies. According to this invention, cleaning is performed in three stages, so that a main fan, installed at the lower area of the cleaning chamber, is provided with a crosswise escape tube. The crosswise escape tube for the main fan is turned to the two cutting rollers. Above the cutting rollers, a lowering fan is provided to deviate, in approximately 90°, the main cleaning air current exiting from the crosswise escape tube and guide it to the unloading cover.

BRPI9500633—Full bed harvesting machine with a high platform, constituting a device guiding sugarcane to the cutting system of the bases, simultaneously topping sugarcane. Generally speaking, the invention consists of a vehicle with a high platform over the wheels, allowing the passage of the equipment over the sugarcane to be cut, and holds a set of engine and cockpit, wherein the engine unit, besides displacing the harvesting machine, activates hydraulic engines, with the machine comprising a lifted cutting set for the bases, with a lifting conveyor belt besides which there is a deflecting plate for guiding the fall of the cane, crosswise to the culture.

BRMU7500199—embodiment of a harvesting machine for sugarcane, constituted by a chassis provided with shafts which edges are provided with wheels with low fluctuation tires, wherein, over said chassis, a cockpit is provided, in front of which a topper device is assembled, on which side line dividers, provided with an external support divisor, are provided; a hinged cutting case is included, behind which a set of conveyor rollers is provided, leading to an orbital chopping set, wherein, on the rear part of the cockpit, a primary extractor and an elevator are provided.

BRPI9400226—Ecological harvesting machine for sugarcane, comprising comprises a chassis covered with plates, with an opening on the lower face of the cockpit to the floor until the middle, and, from the middle of the chassis to behind, the opening is provided on the upper part, through which canes exit. On the front of the chassis, grasped by arms and lifted by a hydraulic piston, there is a ski system with sloped screw on its upper part behind and to the center, activated by an electric engine. Inside the chassis, on the sides and above the front wheel system, there is a system for leaf destruction and flags forming a device to which bearings and rollers are attached; that same device is provided with shafts with holes and screws, to which steel cables are screwed, making a rotating movement activated by an electric engine. On the other side of the opening, in the opposite direction from the destructor on the same direction, there is the nozzle for the air box, which is connected to the turbines which are activated by an electric engine. Subsequently, an identical device is attached in opposition to the first one. Under the chassis, there is a ski system made of a shaft fixed to the front of the chassis by a steel cable, and a hydraulic arm behind. That ski has a cutting disc activated by a hydraulic engine. An arm is welded to the ski, which activates a control for the hydraulic direction of the harvesting machine. Conveyor belts are fixed by shafts and pulleys with a finger on the front part, pulleys with a helical spring on its half and a pulley fixed to an axis activated by an electric engine, all of them fixed to a moving frame, activated by a hydraulic piston on the rear part. There is a platform with a hydraulic piston fixed to the rear part of the chassis, which may be taken off and substituted with a kit. The kit is formed by a chassis including a puller, a chopper, a conveyor screw, a defibrillator, mills, a water tank and showers, a funnel-type case, a juice tank with a valve and a pressure turbine for juice and bagasse. The valves for the shower and the juice tank and the pressure tube of the turbines containing springs holding them closed, are pulled by steel cables inside the cockpit to be opened, wherein they are attached to the levers. That kit is activated by electric engines, which receive energy from the harvesting machine generator.

BRPI9303089—Cutting device for plant stalks, constituted by a cutting disc adaptable to agricultural devices, provided with an adequately treated edge which is not sharpened, provided with other discs of an abrasive material, symmetrically and tangentially located at the outer edge of said disc, fixed by another upper disc and balanced around an appropriate crosswise shaft receiving the rotation effort.

BRPI9303218—Device for harvesting sugarcane, by trimming, cutting, cleaning and carrying sugarcane with the whole stalk, performing scheduled tasks, economically and by means not reducing the subsequent crop potential by damaging the seed bed and crowns; allowing the harvested cane to be free from loose soil and adhering mud, which may damage its chopping, processing and use; taking care of the "whole" plant as a valuable article, flexibly processing the biomass as separated from the cane stalk to facilitate its use. Said harvesting machine may process two rows of cane, with between 1.4 and 1.75 m between the rows and a smaller model with between 1.1 and 1.4 m. The tops of the cane are cut and put in a row in the wind for sun drying on the side which has been already harvested. Sugarcanes are flexed to the front by moving the harvesting machine by means of a roller, while the base is cut with a pair of counter-rotating cutting discs by row. Base cutters automatically follow the level of the soil. Sugarcanes collected with grasped green and dry leaves are mildly, but firmly fed to the front section of the machine by means of a simple throat, aided by vertical and horizontal rubber rollers. By the rotation action, preferably of three pairs of rollers and paddles, stones, residual iron, cans, bottles, soil and mud fall behind the paddles and through screens, and back to the soil; all the materials above 0.25 m are retained by the screens which may be emptied at the operator's choice. Inside the body of the harvesting machine, below and above the cane, a series of special rubber rollers continually increase the peripheral speed, spreading and advancing the cane. As the cane proceeds, still and more quickly, to the body of the harvesting machine, all leaves are separated, and eventually fall through rollers and brushes onto a conveyor moving upwards, on the lower part of the body of the harvesting machine; said transporter is emptied through an opening in the body. The clean cane, at an adjustable speed between 7 and 9 m/sec, is unloaded from the rear portion of the body to fill in a cart engaged behind the main engine. Said cart, built as a high side dumpster, may carry another vehicle with the same capacity or larger.

BRPI9204564—enhancements to harvesting machines for sugarcane, to provide extraordinary operational resources, both functionally and for the preparation and quality of the harvested and cut product, also causing considerable increase in yield over the current state of the art, making the harvesting machine be indicated for sugar and alcohol mills; constituted by a chassis supported over tires, which shafts are provided with eccentric devices, which are adjustable as a function of the fixed height as desired over the soil; on the front part of the device, parallel toothed rollers are located between the side plates guiding the inlet of cane, said rollers being supported over respective chassis, so that the collected cane is submitted to a first cut in knives, then following to horizontal pullers, from there to the rotor where, after being cut into billets, are spun and thrown outside, and, with the help of fans, they reach the main gutter until being released by the diffuser, while a second diffuser works, slightly below the first one, producing the air as required for the leaves and other residues, when falling by gravity, to be separated, wherein the billets are collected on the transportation vehicle for parallel displacement to the machine, while leaves and other materials are thrown away from the same vehicle.

BRPI9206252—enhanced device for cutting and mowing cane to separate bundles, comprising a transporter for forwarding cane lengthwise to a cutter provided with three blades having axially positioned cutting blades located in a rotating hub around a crosswise axis to the direction of remittance or feeding of cane stalks. Cutting blades work jointly with a rotating anvil, which rotates in the opposite direction from the cutter. Besides separating cane stalks to form bundles, the rotating anvil works as a transporter by throwing separated bundles, vertically into a discharge gutter for the swept bulk from the anvil, wherein a path with reduced air pressure created by the rotation of the anvil would bring in separation and unload of cane waste through an opening located at the lower part of the housing.

BRMU7100333—cutting machine for sugarcane, comprising a chassis with bars and engagement supporting a reducer and a cardan receiving the movement of a power outlet from the tractor. The reducer sends, by means of V-shaped belts, movement to the disc cutting, with four knives, the cane passing through the funnel followed by two chains. These two chains are moved by gearings. Said gearings rotate over bearings. The whole set receives the movement of a hydraulic engine which, by means of hoses, receives oil from the quick engagement of the hydraulic pump of the tractor.

BRPI8706619—harvesting machine for sugarcane, constituted by a chassis over which, on its front part and before the movement of the machine, a cane topper, a set of lower cutting knives for the canes, a set of lower cutting knives for already topped canes and a conveyor for the cut cane, with side and rear unloading, relative to the direction of its path, are assembled; a double set of conveyor belts or straps is also assembled to the chassis, which carry engagement teeth with lower V-shaped parts, in between the upper topper and the lower cutting knives; said conveyor belts use a side conveyor, constituted by a chain and a side guide working according to the load of cane; and the chassis, constituting the whole assembled system, is coupled to a tractor.

U.S. Pat. No. 6,363,700—threshing and mowing machine for sugarcane, having a cutter/chopper before a culture division device, with the culture divider helping to move sugarcane to a feeding roller for turning it over, base cutters, a feeding roller system, a cutting system, including a cleaning system and an elevator system. The cutting system provides the cut of sugarcane and debris in a cleaning system wherein the cane and the debris are subject to an air flow generated by a single variable speed fan. The cane and the debris in a cleaning chamber are forced upwards, in contact with the rear wall of the cleaning chamber adjusted at a 60-75° angle. Lighter debris is forced to go upwards and outside through an unloading tube and to the ground, behind the harvesting machine.

U.S. Pat. No. 6,272,820—harvesting machine for sugarcane having a cutting device using pairs of cutting discs and not requiring synchronization of the cutting discs. Each one of the cutting discs has a rotating cutter assembled over its circumference. Cutters are formed from arched segments linked to removable saw teeth assembled at the cutting discs. The arched segments of each pair of cooperating cutting discs are slightly overlaid at the point where both discs abut each other, and are located in a slightly eccentric position over the cutting discs, so that the external borderlines of the circumference of the segments overcome themselves from a maximum to a minimum.

U.S. Pat. No. 6,230,477—harvesting machine for canes in two rows, simultaneously harvesting two rows of sugarcane in a green tropical cane field, and a collecting grid lifts stalks up and support fallen cane stems while the harvesting machine moves through the cane field. A pair of top devices receives cane stems, while base cutters cut the cane. Each one of a pair of rotation devices, spaced crosswise, moves the stem crosswise along the respective upper device towards a central line of the harvesting machine and pushes the covered stems to a direction away from the harvesting movement, so that the covered cane stems do not interfere with the cane moving towards upper devices by the collector chains. The base cut stem is firstly received at the base of the harvest. The cane is cleaned as a whole by a cleaning device including a plurality of rotating teeth being displaced to a direction to fix and force cane leaves towards a base of the cane stalk, efficiently discharging sugar leaves. An extracting fan removes the leaves from rotating teeth and from the clean cane. A stalk cutting device 122 may be adjusted to cut clean cane stems into selected lengths of billets. Clean cane billets may be transported to a conveyor, for transport to a sugar processing mill. An extractor fan removes the leaves from rotating teeth and the clean cane. A stalk cutting device may be adjusted to cut clean cane stems into selected billet lengths. Clean cane billets may be transported to a conveyor, for transport to a sugar processing mill. An extractor fan removes the leaves from rotating teeth and from the clean cane. A cutting device for stalks may be adjusted to cut clean cane stems into selected billet lengths. Clean cane billets may be delivered to a carrier for transport to a sugar processing mill.

U.S. Pat. No. 6,076,340—threshing and mowing machine for sugarcane having a cutter/chopper before a crop division device, with the crop divider helping to move sugarcane to a feeding roller for overturning, base cutters, a feeding roller system, and a cutting system, including a cleaning system and an elevator system.

U.S. Pat. No. 5,724,797—a harvesting device for a forage harvesting line, including a main frame adapted for attachment to a field forage harvester having a harvesting inlet. An endless device, assembled to the main structure, usually crosswise to the direction of displacement of the forage crop, comprises a tube and an outlet assembled to the tube, to fit the upper portion of upright harvests, while the forage harvest passes through the field. A crosswise cutting set, assembled below the auger, has a cutting device to cut the lower portion of upright crops. Elements to fit the lower portion of stems are also assembled below the auger, in cooperation with the rotation of the endless device, under conditions wherein the endless device is turned to a direction pushing the cut material downwards and to inside. After being cut, the cane is pressed behind by the endless device towards a cut outlet on the floor of the device, adjacent to the inlet of the harvesting device to which the device is assembled. Between the cutting engaging elements and the floor, there are elements to receive the crop, cooperating with the endless device to grab the lower part of the crop material before, during and after the cut is performed.

U.S. Pat. No. 5,488,820—device for separating the billet for sugarcane harvesters, comprising a conveyor to feed the cane lengthwise to a three-blade cutter with cutting blades axially assembled to a hub rotating around a crosswise axis to the feeding direction of the stems. Cutting blades cooperate with an anvil rotating around the cutter. Besides cutting cane stems into billets, the rotating anvil serves as a transporter, vertically throwing cut billets into an unloading gutter.

U.S. Pat. No. 5,485,716—harvesting machine for cane with at least two base cutting devices, located so to simultaneously harvest cane stalks from at least two rows. The harvesting device comprises a first base cutting set to cut a first row of cane stalks and at least a second base cutting set located so to form severe sticks in a substantially parallel line to the first row of cane stalks. Cane stalks cut by the second base cutting set are transported by a conveyor to a position close to the first row of cane stalks, to enable cane stalks to then be fed to the harvesting device.

U.S. Pat. No. 5,463,856—device for harvesting stalk-like crops, such as sugarcane, the device comprising: a first hinged engine having a front edge, relative to the direction of movement, with a roller to fold the upper parts of the stems in the direction of movement, at least two base cutters in cooperation for cutting the base of the stalks close to the soil, the cut stalks having their edges extending behind in a displacement direction, and cooperating rollers to grab the cut edges from the stalks, feeding the whole stalks behind. The device also includes an aspirator located at the rear part and operatively linked to receive and clean the whole stalks. The device also includes a top assembly to trim the top of the stalks before cutting the stalk bases, including at least two toppers located on the front of the folding roller.

U.S. Pat. No. 5,379,577—harvesting machine for sugarcane, for simultaneously harvesting at least two rows of cane, comprising: a harvesting frame set including a front edge of a harvesting machine and a rear edge for harvesting extending between a central line of the harvesting frame, usually aligned between the first and the second rows of cane; wherein front and rear wheels are fixed to the frame set of the harvesting machine and a structure of the frame set of the harvesting machine constituted by the frame set of the harvesting machine between the front and rear wheels; one or more bottom cutting sets to cut a base portion of cane within the first and second rows of cane, so to separate the cane from the ground; first and second support sets to transport cut cane behind on their respective first and second rows, each one passing through the front wheels; first and second stack sets to receive the cane from the respective first and second support sets and for each release of a cut billet to a common stack row spaced between the first and the second rows of cane; and third and fourth sets of stacks hinged to the master section of the frame set of the harvester and on the opposite sides of the central row of the frame set of the harvesting machine, the third and fourth stacking sets being selectively displaceable between an open position and a closed position, so that, in the closed position, the third and fourth stacking sets operate as an extension from the first and second support sets, respectively, to deliver the cut cane to the respective first and second stacking sets, and, on the open position, each one of the third and fourth stacking sets receives a cane from the respective first and second support sets, laterally extending outside to an opposite position to a respective front wheel over the central line of the harvesting frame set to release cut cane into a bundle of a stack spaced outside from the respective front and rear wheels.

U.S. Pat. No. 5,303,533—enhanced four-line cane harvesting machine for two rows, including a first and a second front support sets to transport cut cane behind during the first and the second passage, each one passing through the two front wheels and then outwards between the respective front and rear wheels. The first and the second rear stacking sets are provided to receive the cane from the respective first and second support sets and move the cane crosswise before releasing the cut cane through a row of cut canes spaced between the first and the second rows. The support sets on the third and fourth sides are provided with selective movement between an open position and a closed position, so that, in the closed position, each side stacking set receives a cane from the respective first and second support sets, forwarding the cane to the respective rear stacking set and, in the open position, it receives the cane from the respective first and second sets and throws support sticks into existing stack rows, spaced outwards from the respective front and rear wheels. A rear shaft interconnects the pair of rear wheels and provides for reliable harvest classification.

U.S. Pat. No. 5,191,759—sugarcane harvesting machine, wherein the base cut set has been designed and assembled so to allow for convenient removal and/or maintenance of the base cut set. The base cut set has a gearing case extending itself through the space between the side walls, above a path through which the sugarcane is moved and extends beyond at least one of the side walls; a pair of drive shafts extending below from the speed case in the space between the side walls, with each one of the drive shafts supporting cut blades from the base; and an engine to guide the base cutting set which is assembled to the part projecting outwards from the speed case. The base cutting set may be assembled to one or both side walls, preferably with clamps and over an assembly provided on the side walls. One or both side walls may have a cut portion allowing the base cutting set to be laterally taken off between the side walls for maintenance.

U.S. Pat. No. 5,157,904—harvesting machine for sugarcane with a base structure with a moving machine and a cutting device, wherein harvesting tools which may be optionally fixed to the base frame of the machine are provided to adapt themselves to different harvesting circumstances and ground conditions, from which harvesting tools are designed for harvesting one single row and for harvesting various rows. Harvesting accessories include line dividers, a cutting device and a feeding device. The harvesting device for various rows overcomes the cutting device mainly on one side, so to generate symmetry over the device.

U.S. Pat. No. 5,129,219—base cutting set for a harvesting machine for sugarcane, avoiding the accumulation of residues around the drive shaft of the base cutting set. The base cutting set is provided with a molded drive shaft making the residue rolled over the shaft to migrate to an intermediate part of the drive shaft; and a cleaning means positioned side by side with the intermediate portion and adapted to remove the residue accumulating on the intermediate portion. Cleaning means may have the shape of a rotating wheel which is sloped over the lengthwise axis of the drive shaft.

U.S. Pat. No. 5,092,110—primary extraction device for a harvesting machine for sugarcane, provided to separate the residual material from the cane from a harvested flow of cut and transported billets. The device is used with sugarcane harvesting machines wherein cane billets are continually fed in a cleaning chamber, wherein an exhaustion process by airflow eliminates residues. Air inlets are in the form of a series of side openings, each one having vertically expanded grid plates, respectively sloped to inside the external wall of the frame.

U.S. Pat. No. 4,783,952—harvesting machine for sugarcane, including a transporter for sugarcane billets and a suspended rake set above the billet transporter, including a number of spaced nipples engaging the billets on the transporter to extract the residue, leave it and level the billets on the transporter.

U.S. Pat. No. 4,722,174—harvesting machine for sugarcane in two rows, using one single crossing bar to transport two rows of cane behind, merging the two rows of cane and unloading both rows cane into lateral positions set over the path of the harvesting machine by means of a crossing arm, including a laterally adjustable unloading device, allowing stacks of six rows of sugarcane to be formed not rolling over the initial row. The crossing arm includes one single motor jaw chain set, guided in opposition to a roller chain, not fed to grasp and transport sugarcane billets over the harvesting machine.

U.S. Pat. No. 4,646,512—harvesting machine for sugarcane with a pair of counter-rotating cutters to cut the cane on its base and raise its edges to a transporter delivering the cane through fragmentation devices, and then to a pair of rollers moving the cane from the transporter and taking it to the open end of a container against an adjustable barrier located along the container of said open end. The barrier is located according to the length of the cane being harvested and cutters are provided to cut cane stalks, wherein they are projected to the open end of the transporter to separate the tops from the stalks.

U.S. Pat. No. 4,555,896—harvesting machine for sugarcane, wherein the cut crop is transported from a cutting device to a cleaning device. The cleaning device includes an exhaustion fan located at an upper portion of a cleaning cylinder and a substantially unobstructed air inlet surrounding the perimeter of the cleaning cylinder. The air inlet extracts air into a usually downwards direction through the air inlet and inside the cleaning cylinder, and upwards through a substantial portion of the crop, after it exits the cutting device. Residues are expelled upwards through the exhauster, while the clean crop falls to an elevator for transport, away from the cleaning device.

U.S. Pat. No. 4,550,552—harvesting machine for sugarcane. A cutter cuts the shaft and feeding means feed the cane along a lengthwise feeding path to a cutting means to cut the cane into billets. A discharger unloads billets from the harvesting machine. Cutting means comprise lengthwise moving blades spinning around a crosswise axis to the feeding path, sweeping a cylindrical or truncated cone path. A fixed blade cooperates with the moving blades traveling upwards, above the fixed blade. Means for engaging billets located between the shaft and the moving blade engage and fix the cane before cutting. After cutting, cane billets are thrown upwards, away from the cutting means on the unloading gutter.

U.S. Pat. No. 4,512,142—attachment for a harvesting machine for sugarcane for collecting, cutting or crushing undesired and unusable upper portions of sugarcane tops, so that the remaining portion of the sugarcane stalk may be harvested by conventional means. The accessory includes a collecting roller system, interconnected to a rotating knife set to form an integral unit with the knife set including a unique arrangement of radial and lengthwise blades assembled on a drum or cylinder, turning around a axis sloping upwards and to the front, in a fixed angle over a vertical line, to provide more effective crushing of the stalk with the collecting system, allowing cane harvesting to more efficiently deal with fragile cane varieties, reducing broken fragile stalks, thus allowing sugarcane producers to use more fragile species of sugarcane which are resistant against diseases and insects, with efficient shaft grinding, allowing for increased control of sugarcane borers, thus eliminating a significant part of the winter habitat of sugarcane borers.

U.S. Pat. No. 4,471,602—motor harvesting machine for sugarcane, having a plurality of cutting rollers cooperating to each other in pairs, so to cut cane stalks. Cutting rollers are rotatingly supported to opposed walls of the harvesting case. Each roller has two opposed flanges at their edges, which are connected to the flanges rotatingly supported to case walls. Each individual roller is disassembled by just loosening the roller flanges from the flanges supported on the case walls, and thus the roller may be easily pulled outside from the compartment for maintenance or for any other operation.

U.S. Pat. No. 4,470,244—feeding device for harvesting sugarcane, including a pair of rotating cane dividers spaced from each other. The feeding device is provided with a mechanism to adjust the distance between two space cane dividers. That mechanism is operated from a support for an operator of the harvesting machine and includes a hydraulic cylinder-piston unit, wherein the piston is connected to one of the cane dividers and the cylinder is connected to the frame of the harvesting machine.

U.S. Pat. No. 4,443,999—cutting device for a harvesting machine for sugarcane, including a pair of rotating rollers, each one provided with oblong cutting bands having various parallel blades extended to the axes of the respective rollers. Each roller is formed with an oblong support band and a number of support protrusions spaced from the band, so to form a plurality of grooves, each individual blade to receive the cutting chain and a grasping element. The blade and the grasping element are grasped between the side walls of the groove by means of a screw extending itself through the grasping element in the roller body.

U.S. Pat. No. 4,426,826—self-propelled harvesting machine for sugarcane, having a harvesting and crushing device, a sloped transporter, a crosswise sloped transporter for unloading, a pressure fan located near an outlet end for the sloped transporter to guide an air current through the flow of chopped cane and an additional suction fan located to provide for uniform air current in the transition region between the sloped transporter and the unloading transporter, in an inlet region for an unload nozzle.

U.S. Pat. No. 4,408,441—sugarcane harvesting machine having, on its front part, a top section to cut the upper part of the cane and upper and lower sets of collecting arms gathering canes for guiding them. The top section is moved on a moving base, which is vertically assembled on vertical rails to vary the height of covering cuts. The base is also hinged to the harvesting ends of the upper set of collecting arms for sugarcane, thus interconnecting the cutting inlet or the harvesting machine and the ends of the arms and the upper part for combined movement. With variable length, telescopic support arms are hinged between the left, upper and lower arms, and the right, upper and lower arms, respectively, so to provide stabilizing support to the upper sets of arms when vertically varied with the top section. The vertical movement of the top section keeps an ideal cutting angle, despite the adjustment of cutting height and the combined movement of the upper collecting arms for sugarcane.

U.S. Pat. No. 4,407,111—Harvesting device for shaft crops, such as sweet sorghum or sugarcane. The device incorporates a pair of spaced cutting blades in counter-rotation, including cutters pressing the stems in many places to feed stems. They feed the stems towards an extraction drum. The extraction drum crushes stems with a pair of anti-rotating rollers. That squeezes the recoverable liquid and pulp from the stalk, flowing downwards to the bottom of the set, where it is collected by a container and subsequently removed.

U.S. Pat. No. 4,295,325—harvesting machine for sugarcane, having a main frame assembled to a wheel or equivalent, a base cutter for cutting cane close to the ground level while the harvester is moving, a cutting device to cut cane stalks into billets, means for feeding the stalks from the base cutter to the cutting device and means for lifting and unloading billets, the cutting device and the lifting means including a rotating cutter with a knife blade in a rotating axis and a thrower with a paddle extending itself from a throwing axis, wherein both axes are parallel in counter-rotation, the knife blade of the cutter and the paddle cooperating to cut the fed cane to the cutting device into billets, the lever of the activating device acting to throw cut billets upwards through a guiding gutter for cane from where they are unloaded, preferably into a compartment assembled to the main frame and able to tilt, so to empty its contents.

U.S. Pat. No. 4,272,947—topper for a harvesting machine for sugarcanes, supported and vertically adjustable to the front of the harvesting machine for topping the cane to be harvested, having a frame with two adjacent rotating feeding drums with radial fingers to fit the shafts and feed them behind, and a pair of cutters, one behind each feeding drum, to cooperate with the feeding drum to cut the shafts. A moving deflector is provided on the frame to guide cane shafts as selectively collected for each set of feeding drum and billet cutter, and both sets of feeding drum and cutter are located, jointly with guides on the frame, to expel cut parts in opposition to the sides of the frame.

U.S. Pat. No. 4,270,337—harvesting machine for sugarcane or similar products providing for significant reduction of moving parts and for more efficiently cleaning the harvested product than it was possible so far. This is reached by substituting individual constituents known for cutting, lifting and cleaning cane with one single rotating mechanism, provided with one single reversible rotation axis which is provided with displaceable knives and wings or fixed throwing wings, which openings are included in a cylinder with an upper outlet unloading cane billets into a moving duct.

U.S. Pat. No. 4,232,775—in a motor four-wheel hydraulic harvesting machine for sugarcane with a stack of four rows and a main energy source guiding pumps with variable volume for propelling and operation; structural and operational enhancements to a short wheel base, external extension from the rear right central support, individual suspension for rear wheels for stability on irregular terrain, steerable rear wheels which may be uniquely linked by means of bell handle connections, simple hinging posts with stacking ability in various rows, adjustable deflectors for shaft ends and a combination of speed controls and speed with independent regulation of speed for the earth net and a unit control for the support chains for cane cut from all speeds within the adjusted range.

U.S. Pat. No. 4,196,569—harvesting machine for sugarcane or similar crops with a feeding roller with feeding elements extending along the roller to successively engage stalks in the roller rotation, to feed the stalks in a crosswise direction to the rotation axis of the roller. At least one of the feeding elements is in the form of a deformable hollow structure made of an elastomeric material.

AU2060976—air inlet for the device for residue removal from a harvesting machine for sugarcane. The inlet of air forms the lower portion of the container for the residue removal device and also serves to guide cane billets into the hopper of a hinged unloading transporter for billets. The inlet of air is formed as a curtain made of perforated air-permeable rubber sheets avoiding both damage to the entrance of air and clogging to the transporter during the use.

Therefore, the state of the art teaches many different devices for harvesting sugarcane. Harvesting sugarcane without previous burning now requires improved harvesting machines to enhance even more the harvesting process after cutting the stalks. The state of the art teaches a considerable variety of harvesting machines for sugarcane. Depending on the final preparation of the harvested cane, the existing machines present considerable modifications, but all of them show some given sets configuring the front part of the machine. Despite having embodiment variations, these sets always have the same purpose. Initially, all the machines have a first set defined as a row opener, designed to guide the row of cane to be harvested to inside the machine. Base cutters and top cutters are then included, but, in some cases, only base cutters are included, which are responsible for cutting canes close to the soil, releasing them to enable the machine to pull them inside and perform the subsequent harvesting steps. Said base cutters may usually be rotating knives, cutting wires, cutting discs and/or others. After being cut, canes are pulled inside by their lower ends and, for that purpose, there are toothed rollers performing said functions. Then, the harvested material may go through different processing stages, depending on the kind of harvesting machine. They may be cut into billets, chopped, milled or squeezed.

It is usually desirable that, subsequently to the cutting front, the machine has an efficient system to pull the cut cane and guide it to the subsequent stage. Usually, the state of the art combines various toothed rollers for that operation, but we have noticed that said system does not have the desired efficiency, i.e. the volume of cane entering the machine is usually variable, and consequently, every pulling set for the cut cane would need to have means to compensate said variation of volume and means to enable each pulled cane to be also distributed more efficiently when delivered to the following stage inside the harvesting machine, which currently does not happen with the desired efficiency.

SUMMARY OF THE INVENTION

Currently, the distribution of the cane bundle over horizontal rollers and over the chopper, as explained above, is random, thus resulting in concentrated and/or non-uniform wear along the width of the cutting blades of the chopper. The present invention thus seeks to provide an improved mechanism for feeding the devices intended to harvest sugarcane, especially for devices using cutting systems facing difficulties to feed the cane bundle, which may be applied both for harvesting devices for a single planting row and for harvesting two or more rows. The present invention also seeks to improve the horizontal distribution of the cane bundle, guiding it according to each situation. To define a specific feeding set to pull, guide and distribute cut stalks of sugarcane to inside the harvesting machine.

The present invention presents embodiment details allowing its assembly at any sugarcane harvesting machine, no matter which is its cutting system, which may be: rotating knives, cutting discs or cutting wire. Also, it does not matter which are the exiting sets after the feeder, since, as shown, the state of the art provides harvesting machines with different sets to perform equally different stages, according to the final product as desired, be it chopped into billets, in stalks, squeezed and/or others.

The feeder of the present invention comprises at least one pair of vertical traction rollers, both impelled by their respective hydraulic engines, also assembled floating over a respective structure for the distance between the two of them to be self-adjustable according to the volume of sugarcane being cut and entering the machine.

Therefore, said traction rollers constitute a set pulling and guiding sugarcane stalks after being cut, guiding them into the harvesting machine, where they go through different processing stages, depending on the final characteristics as established for the sugarcane as harvested.

Another object of the present invention is to provide means to change the speed of said floating rollers. Speed changes are defined so to reach different feeding results, i.e. both rollers may be turned exactly at the same speed and such synchronism allows for sugarcane stalks to be pulled behind practically straight with no flow deviation.

On the other hand, by changing speeds between said floating rollers, a special effect is obtained when sugarcane shafts leave the rear parts of said floating rollers, i.e. there is an angled or sloped outlet always towards the side of the roller turning at lower speed; consequently, that effect allows the volume of cane as fed and exiting the feeder to be guided in angle to the left, to the center or to the right, thus allowing for the desired distribution of the volume of sugarcane before entering the subsequent set of a harvesting device, such as before entering a chopper cutting the stalks into billets.

DETAILED DESCRIPTION OF THE INVENTION

Figure 1:
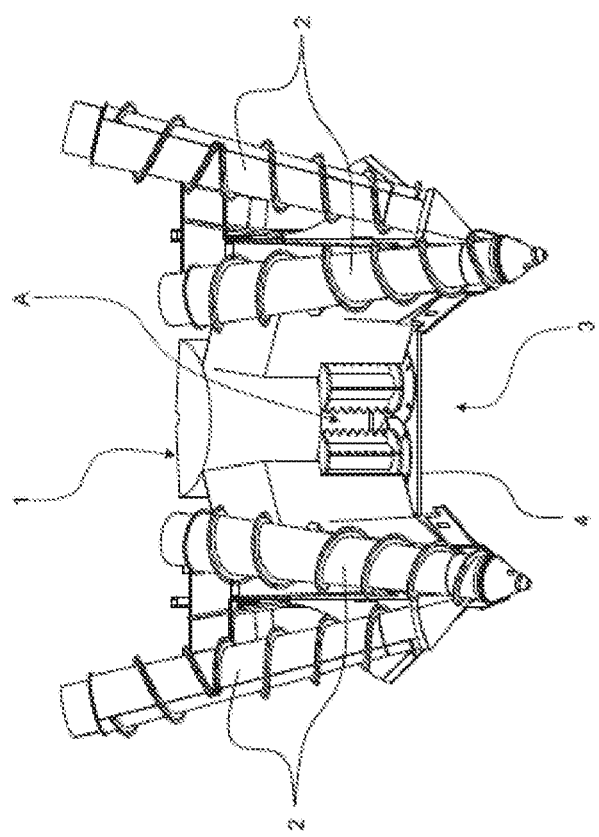
FIG. 1 is a schematic perspective view in a front angle of an example of the present self-adjustable feeder assembled in a conventional harvesting device of the prior art.
Figure 2:
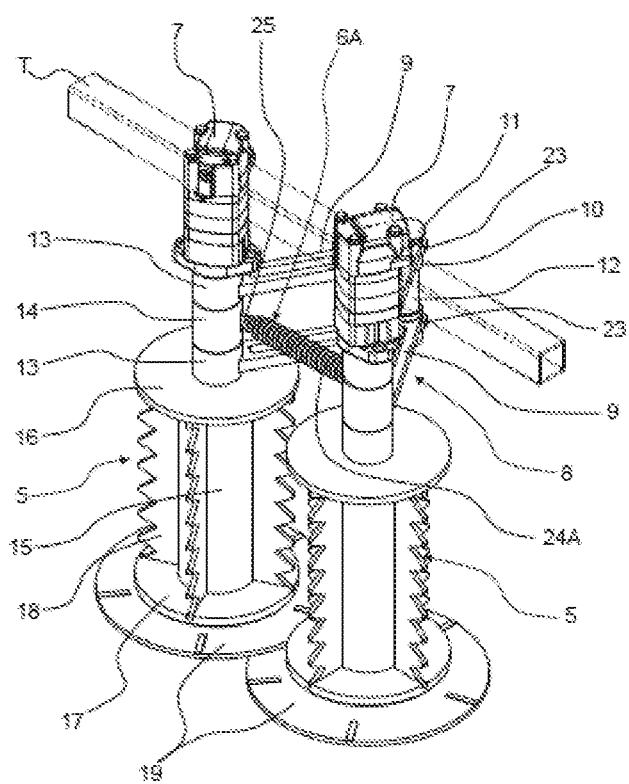
FIG. 2 shows an isometric view showing the feeder in an upper front angle.
Figure 3:
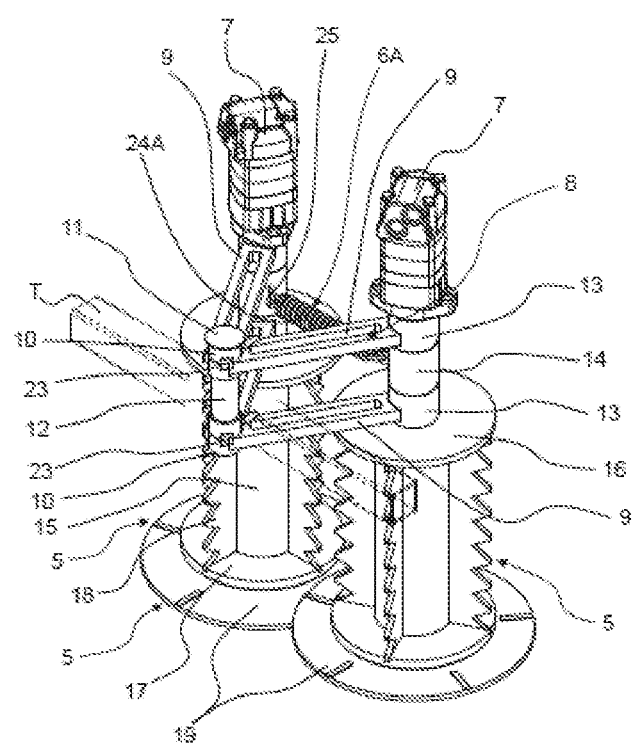
FIG. 3 shows an isometric view showing the feeder in an upper rear angle.
Figure 4:
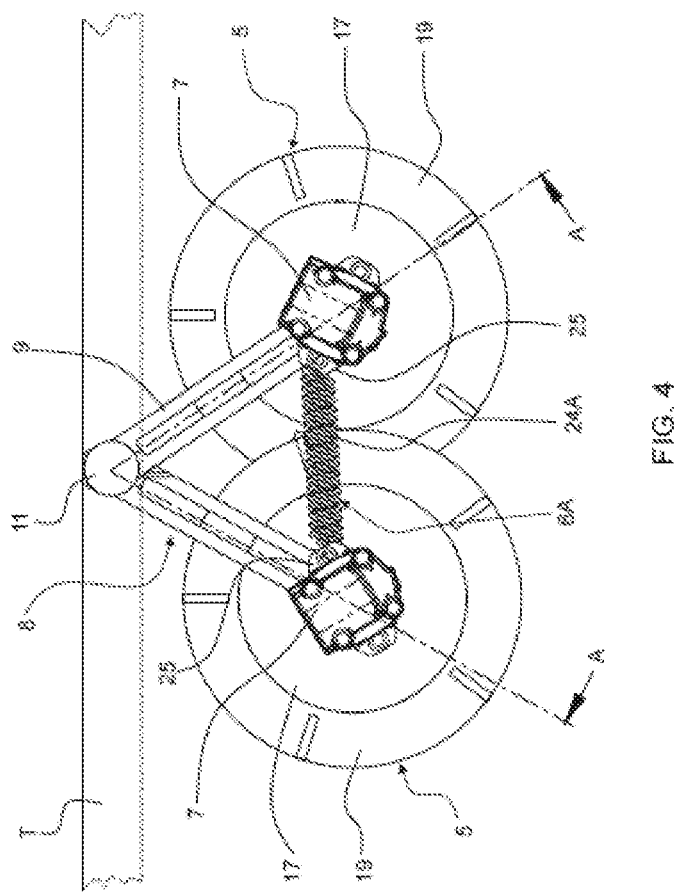
FIG. 4 shows an upper elevation view of the set with the cut indication A-A.
Figure 5:
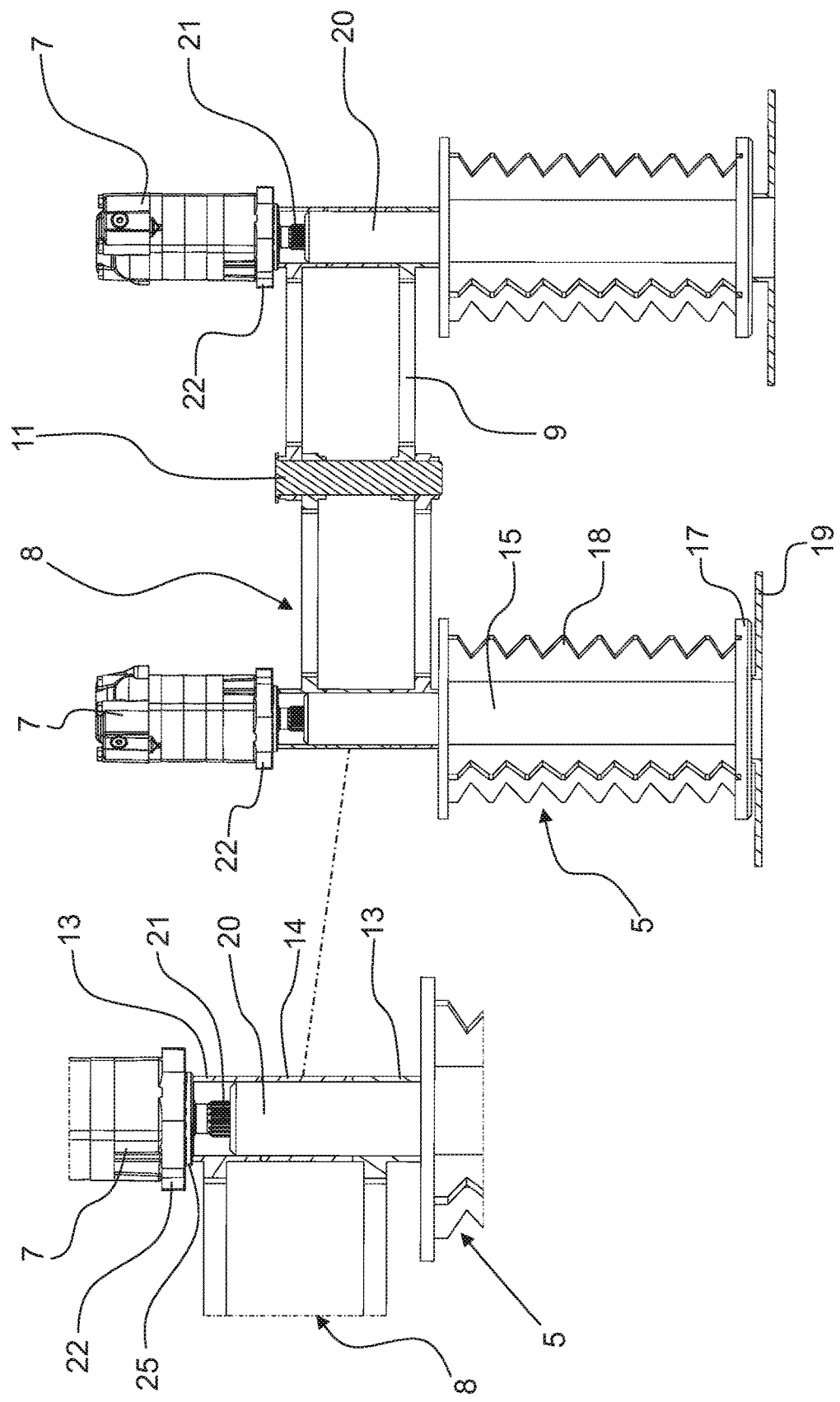
FIG. 5 shows a cut view A-A and its enlarged detail.

The self-adjustable feeder for sugarcane harvesting device of the present invention is a complementation to be assembled to different harvesting machines for sugarcane, as per the example of FIG. 1, wherein only the front part of a conventional machine is shown, and we verify that the example refers to a harvesting machine having a work front for harvesting at least one row of sugarcane, provided with a front frame as usual (1) with at least one set of row openers (2), between which a funnel passage (3) for the inlet to the row to be harvested is formed. On that funnel passage, a first set of any cut is assembled, appropriate to cut the canes at their base. In that example, it is a cutting wire (4), but, as already stated, said cutting system is variable, and may be a cutting disc, rotating knives and/or others, always assembled on the width of the funnel passage (3), wherein sugarcanes are cut to their bases and then sufficiently sloped to enable said cut ends to be pulled by the present feeding set (A).

Now, as shown in FIGS. 2 to 5, the self-adjustable feeder for sugarcane harvesting device of the present invention comprises two vertical and rotating feeding rollers (5) in opposite directions, aligned side by side and horizontally movable, always kept under traction to each other by at least one actuator (6A). The upper edges of both feeding rollers (5), besides being coupled to hydraulic rotating engines (7) in opposite directions, are also hinged to a rear open-close structure (8), with guiding means for varying the distance between the vertical centers of said feeding rollers (5).

The open-close structure (8) comprises two pairs of swinging arms (9), located in a lying "V-form", each pair with its stalks located in parallel, one above the other, and having their rear edges integrated to first tubular gloves (10), axially aligned one over the other and hinged by a hinging pin (11) forming, between said first tubular gloves (10), a space (12) for housing any beam (T) which, besides being an integral part of the usual front frame (1), is also crossed by said hinging pin (9), wherein a support point for the whole set is formed.

Each one of the front edges of the hinging arms (9) has one of its shafts equally integrated to second tubular gloves (13), axially aligned in pairs, one above the other, forming another space between each pair, but housing a third tubular glove (14), the latter and the former constituting rotating support bearings for the feeding rollers (5).

Each feeding roller (5) is formed by a cylindrical center (15), the edges having an upper flange (16) and a lower flange (17), between which various toothed rulers (18) are located lengthwise, radially and equidistantly, and also, below the lower flanges (17), each one of said rollers has a trimming disc (19) with a larger diameter, sufficiently spaced horizontally for one to be over the other in a most closed position or in the open position of said feeding rollers (5).

The upper edges of the feeding rollers (5) project themselves as the edges of axes (20), housed in rotation inside the second tubular gloves (13) and third tubular gloves (14), wherein said edges of axes (20) are axially linked to bound axes (21) of the hydraulic engine (7) which, on the other hand, has its flange (22) fixed over the respective second tubular glove (13).

The rear ends of the arms (9) have opening first limiter stoppers (23), which limit the maximum opening of said hinging arms (9), and consequently also limit the opening of feeding rollers (5).

In a preferred embodiment, the actuator (6A) is a first helical spring (24A), which hooked edges are coupled to supports (25) fixed to the respective third tubular gloves (14).

Figure 6:
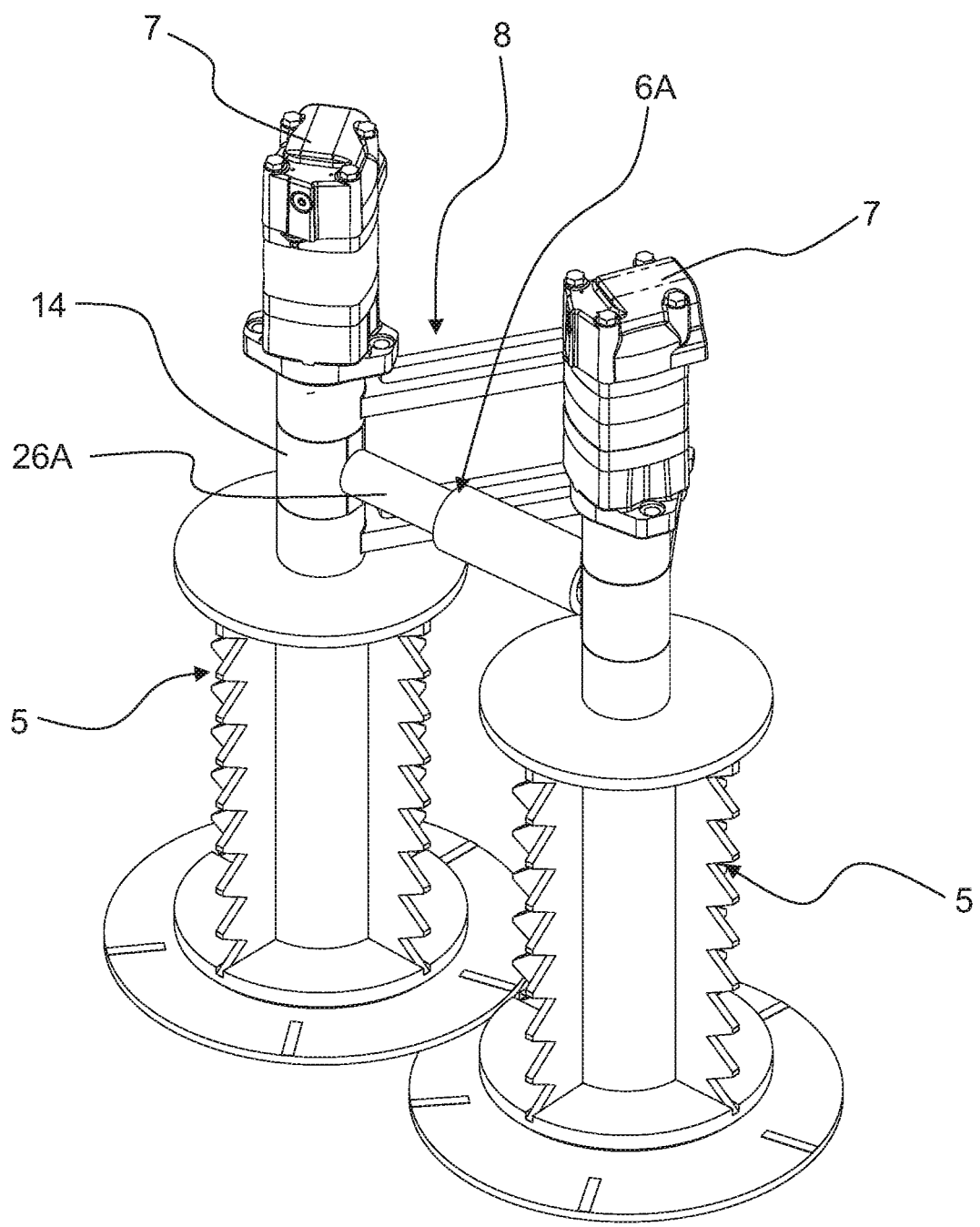
FIG. 6 shows an isometric view of the set highlighting that, in an embodiment variation, the actuator pulling the feeding rollers is a hydraulic/pneumatic cylinder.
Figure 7:
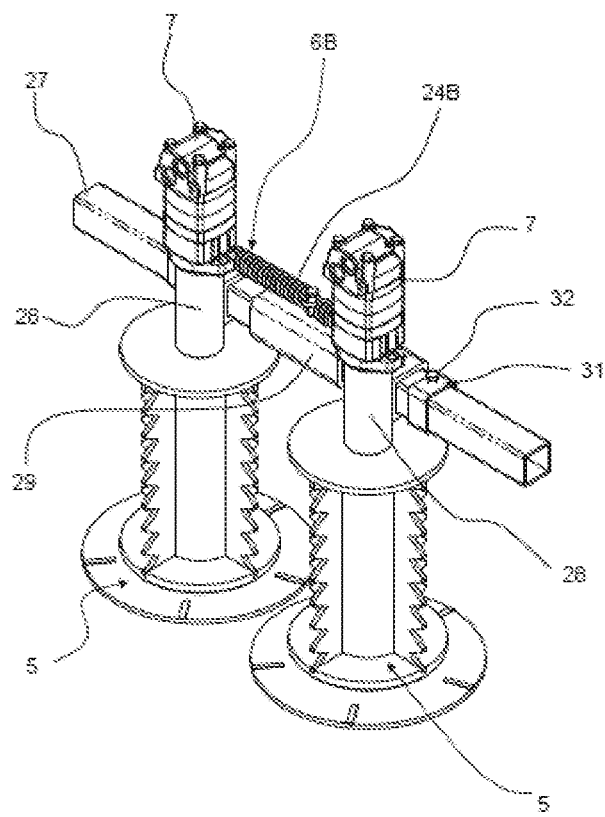
FIG. 7 is an isometric view in an upper front angle highlighting another embodiment and, in this case, feeding rollers are slidably assembled to a beam.
Figure 8:
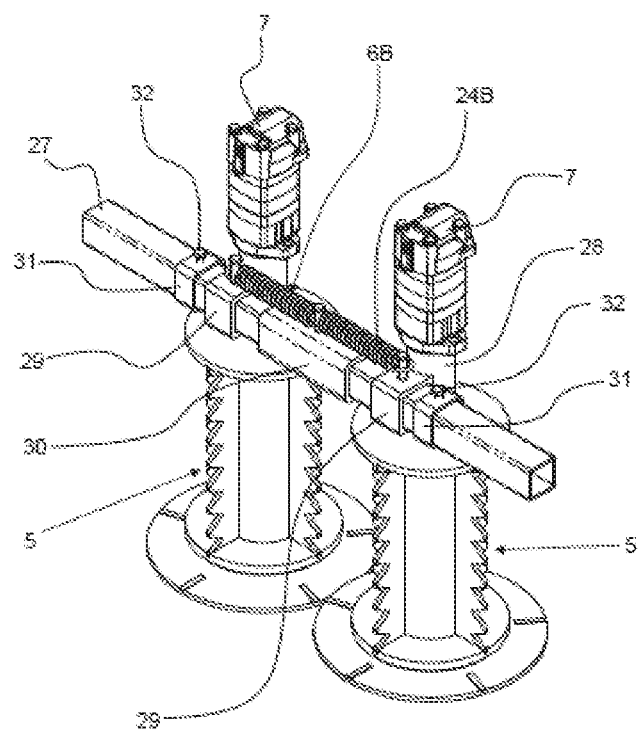
FIG. 8 is another isometric view in an upper rear angle, also highlighting the embodiment of the feeding rollers as slidingly assembled to a beam.
Figure 9:
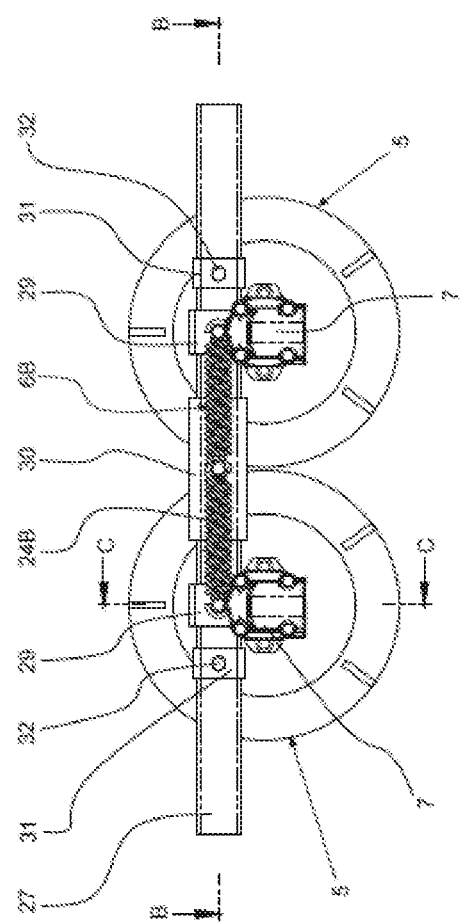
FIG. 9 shows an upper elevation view of the embodiment of the feeding rollers as slidably assembled to a beam.
Figure 10:
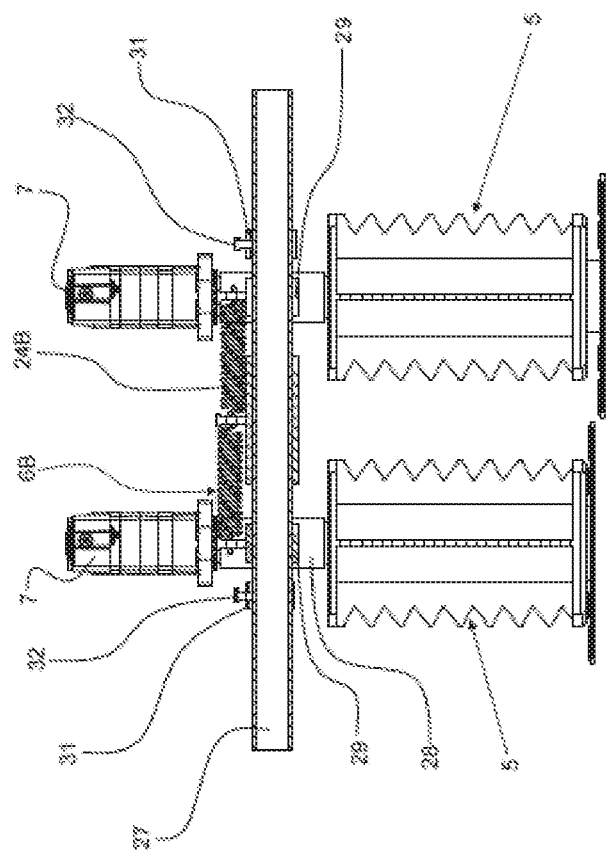
FIG. 10 shows a cut view B-B as shown by FIG. 9.
Figure 11:
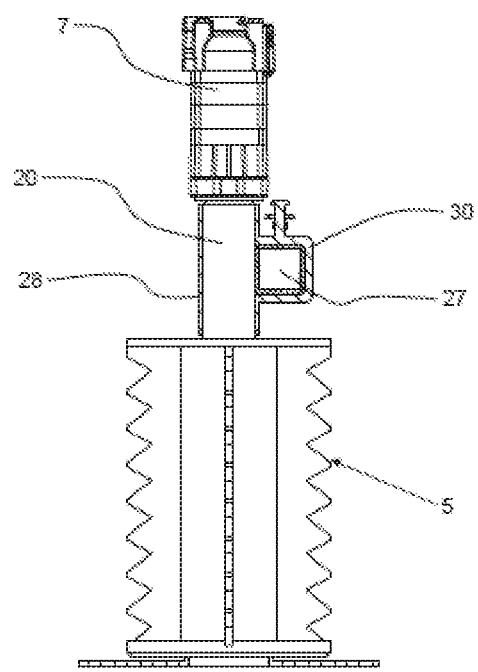
FIG. 11 shows a cut view C-C as shown by FIG. 9.

As shown by FIG. 6, in another preferred embodiment, the actuator (6A) is a hydraulic or pneumatic cylinder (26A), which edges are hinged to the respective third tubular gloves (14).

The function of the actuator 6A, whether it be the first helical spring (24A) or the hydraulic or pneumatic cylinder (26A), is to maintain a sufficient tensile force so that the two rotating feeding rollers (5) are held against each other (pressed against one another). This tensile force is overcome by the amount of material passing between the two rotating feeding rollers (5). In this condition it is possible to vary the distance between said rollers according to the volume of material passing therethrough.

As shown by FIGS. 7 to 11, in another alternative embodiment, feeding rollers (5) are slidingly assembled to a guiding tube (27) and, for that purpose, each feeding roller (5) has one single glove (28), which, on the inner side, constitutes a housing bearing for the edge of the axis (20), while, on the outer side, it is integrated to a passing support (29), on which internal side said guiding tube (27) passes freely. Also, between the two passing supports (29), there is another similar part constituting an intermediate support (30) which, on the other hand, fixes the edges of double actuators (6B) in the form of second helical springs (24B), which opposed edges are equally fixed to the passing supports (29) of the respective feeding rollers (5), the maximum distance between which is adjustably defined by two second stoppers (31), both slidingly located in the guiding tube (27), where they are fixed by the respective regulating bolts (32).

Figure 12:
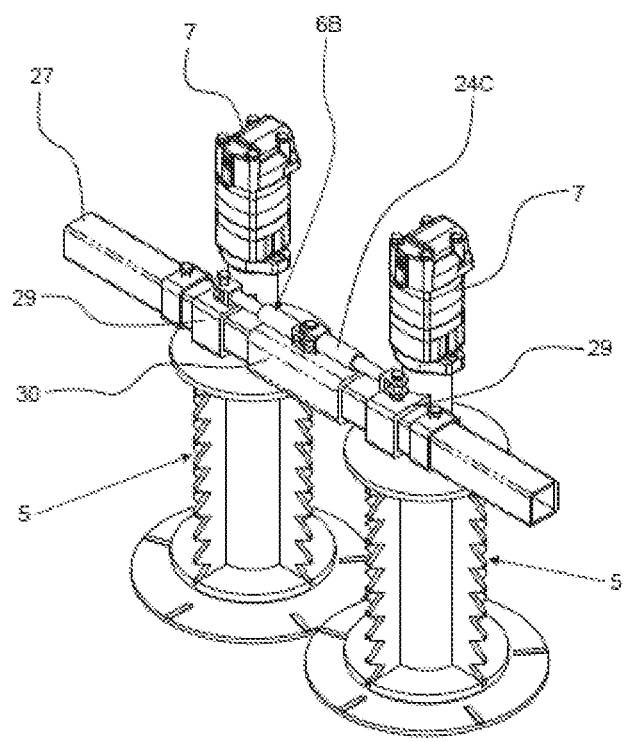
FIG. 12 shows an isometric view of the set showing an embodiment variation of the set.

As in the previous embodiments, the double actuator (6B), in the form of the second helical springs (24B), may also, as shown by FIG. 12, be substituted, when required, by actuators in the form of a pair of hydraulic/pneumatic cylinders (24C), which edges are hinged to the intermediate support (30), while its opposite edges are hinged to the respective passing supports (29) of the feeding rollers (5).

As it can be seen from the specification and drawings, the first object of the invention is reached by presenting an improved alternative for feeding devices intended to harvest sugarcane, mainly for equipment using cutting systems with difficulties for feeding sugarcane bundles. Appropriate for both harvesting devices in a single planting row and for harvesting two rows, it may also be used for harvesting multiple rows.

Another object as reached is to improve the horizontal distribution of the sugarcane bundle, guiding it according to each situation. Currently, the distribution of the sugarcane bundle over the horizontal rollers and the chopper is random, thus resulting in concentrated and/or non-uniform wear along the width of the cutting blades of the chopper usually being an integral part of a harvesting machine.

The operation of the set is simple, i.e. feeding rollers (5) are located shortly after the cutting system (4), where they are vertically located and turn in opposite directions, in a trend to pull the material inside the device. The distance between the vertical centers of the feeding rollers (5), determining between them the opening of the passage for already cut sugarcane, is already configured for the initial position of the rollers to be always the minimum opening, so to guarantee the traction of the sugarcane bundle, no matter which is the quantity of material to be fed. A detail to be highlighted are the actuators (6A-6B) joining both hinging arms (9), which are actuators, represented in this case by springs and cylinders, which may also be an electric or electric-hydraulic device, having, besides the object of determining the initial position of rollers, the object to apply normal compression force to the sugarcane bundle to guarantee its traction. Therefore, as the volume of material increases, the opening between the feeding rollers (5) consequently increases. Another important point is that the actuators are able to proportionally increase the normal force with the increase in opening, thus managing to guarantee good traction to the sugarcane bundle. As the system cuts the sugarcane, the rotating movement of feeding rollers (5) pulls the cut material to inside the equipment and the opening or distance between the vertical rollers varies according to the quantity of material entering it, and automatic feed adjustment is consequently performed.

As already stated, the edges of the feeding rollers (5) have discs (19), with identical or different diameters, appropriate to guarantee that the collected sugarcane does not fall during the operation of the set.

With the present invention, another object is reached, consisting of significantly improving the distribution of the harvested volume of sugarcane to inside the harvesting machine, by directing the harvested bundle of material crosswise, which has been reached by independently controlling the rotation of feeding rollers (5) by means of the respective hydraulic engines (7). By that rotation control, with one higher and a lower rotation engine, the sugarcane bundle may be directed to the left or to the right, as long as the lower rotation engine is the one on the side to which the bundle should be guided. Also, with the possibility of rotation variation, the system can be configured by means of electric/electronic control, so that, from time to time, the direction of the sugarcane bundle may be changed to the left, to the right or to the center, so to make better use of the width of the inlet nozzle of the harvesting machine, consequently providing for uniform feed, especially when the harvesting machine includes a chopping set.

It will be understood that certain characteristics and combinations of the self-adjustable feeder and the harvesting machine for sugarcane may vary considerably, keeping the same functional concept for the set. Consequently, the embodiment as now disclosed in detail as an example is clearly subject to embodiment variations, but always within the scope of the invention as now disclosed of a feeder with at least two vertical rollers kept pressed against each other, and the distance between their vertical centers is automatically regulated according to the volume of sugarcane being pulled to inside the machine. Therefore, many changes may be performed to the configuration as now detailed according to the description requirements established by law, being understood that the details as included should be interpreted in an illustrative and not limiting way.

The invention claimed is:

1. A self-adjustable feeder for sugarcane harvesting device comprising:
   (a) two vertical parallel rotating feeding rollers, each feeding roller comprising:
      a cylindrical center with an upper edge having an upper end flange and a lower edge having a lower end flange;
      multiple radially equidistant toothed rulers located lengthwise between the upper end flange and the lower end flange, and
      a trimming disc with a larger diameter, placed below the lower flange;
      wherein the rotating feeding rollers are sufficiently distant so that the trimming discs are enabled to be placed one over the other in a closed position or enabled to be placed apart in an open position of the feeding rollers,
   (b) at least one actuator providing traction to the two rotating feeding rollers maintaining a sufficient tensile force so that the two rotating feeding rollers are held against each other; the tensile force overcome by harvested sugarcane passing between the two rotating feeding rollers,
   (c) two hydraulic engines coupled to the upper edges of the two rotating feeding rollers, also rotating in opposite directions, and
   (d) a rear opening and closing structure, hinged to the upper edge of each of the feeding rollers, with guiding means to alter a distance between the two rotating feeding rollers.

2. The device of claim 1, wherein the opening and closing structure comprises:
   (a) two pairs of V-shaped hinging arms, each pair with corresponding upper and lower shafts in a parallel position, and having front and rear edges;
   (b) first tubular gloves, integrated with the rear edges of the hinging arms, axially aligned and hinged by a hinging pin, the first tubular gloves defining a first space for housing a beam, and
   (c) second tubular gloves integrated to the front edges of the hinging arms, axially aligned defining a second space housing third tubular gloves, the second and third tubular gloves bearing the feeding rollers.

3. The device of claim 2, wherein the upper end flanges of the feeding rollers extend on axis edges, rotatingly housed inside the second and a third tubular gloves, the axis edges axially coupled to bound axes of each of the hydraulic engine, fixed over the respective glove on one end and at a third flange on an opposite end.

4. The device of claim 2, wherein the rear edges of the hinging arms have stoppers limiting opening of the hinging arms.

5. The device of claim 2, wherein the actuator is a helical spring, having hooked edges coupled to supports fixed to the respective third tubular gloves.

6. The device of claim 2, wherein the actuator is a hydraulic or pneumatic cylinder, having edges hinged to the respective third tubular gloves.

7. The device of claim 1, wherein each feeding roller has a single glove, the single glove housing an edge of an axis, projected from the feeding roller, and
   wherein a passing support is integrated to the single glove, the passing support housing a guiding tube, and wherein an intermediate support is fixed to the edges of a double actuator comprising second helical springs on one end, with an opposite end fixed to passing supports on the respective feeding rollers, and wherein two stoppers, each slidingly located in the guiding tube, are fixed by respective adjusting bolts, determining a maximum distance between the respective feeding rollers.

8. The device of claim 7, wherein the double actuator is a pair of hydraulic or pneumatic cylinders.

9. The device of claim 1, wherein the hydraulic engines independently control rotation of the feeding rollers to direct the flow of sugarcane to the center or to any of the sides.

* * * * *